United States Patent
Nishimura et al.

(10) Patent No.: US 10,386,971 B2
(45) Date of Patent: Aug. 20, 2019

(54) SENSOR DEVICE, DISPLAY UNIT, AND INPUT UNIT

(71) Applicant: SONY CORPORATION, Tokyo (JP)

(72) Inventors: Taizo Nishimura, Kanagawa (JP); Fumihiko Iida, Kanagawa (JP); Hiroshi Mizuno, Kanagawa (JP); Yasuyuki Abe, Kanagawa (JP); Takayuki Tanaka, Kanagawa (JP); Hayato Hasegawa, Kanagawa (JP); Shogo Shinkai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 259 days.

(21) Appl. No.: 14/910,117

(22) PCT Filed: Jul. 23, 2014

(86) PCT No.: PCT/JP2014/069383
§ 371 (c)(1),
(2) Date: Feb. 4, 2016

(87) PCT Pub. No.: WO2015/033684
PCT Pub. Date: Mar. 12, 2015

(65) Prior Publication Data
US 2016/0179248 A1    Jun. 23, 2016

(30) Foreign Application Priority Data
Sep. 3, 2013 (JP) ................. 2013-182509

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 3/0412* (2013.01); *G06F 2203/04102* (2013.01); *G06F 2203/04103* (2013.01); *G06F 2203/04106* (2013.01)

(58) Field of Classification Search
CPC combination set(s) only.
See application file for complete search history.

(56) References Cited

U.S. PATENT DOCUMENTS

| | | | |
|---|---|---|---|
| 2009/0174832 A1* | 7/2009 | Lee .................... | G02F 1/13338 349/43 |
| 2010/0080967 A1* | 4/2010 | Hu ....................... | G06F 3/045 428/203 |
| 2012/0299872 A1* | 11/2012 | Nishikawa .............. | G06F 3/045 345/174 |
| 2014/0092350 A1* | 4/2014 | Byeon .................. | G02F 1/1339 349/106 |

FOREIGN PATENT DOCUMENTS

| | | |
|---|---|---|
| JP | 2012-243935 | 10/2012 |
| WO | 2011-071096 | 6/2011 |

* cited by examiner

*Primary Examiner* — Robin J Mishler
(74) *Attorney, Agent, or Firm* — Chip Law Group

(57) ABSTRACT

A sensor device includes: a sensor layer provided at a position facing a surface, of a substrate having an operation surface, opposite to the operation surface, and configured to detect a contacted position or a pressed position on the operation surface; and a gap layer located in a gap between the substrate and the sensor layer. The gap layer includes a bonding region bonding the substrate to the sensor layer, and a relaxation region relaxing stress applied from the substrate to the sensor layer.

11 Claims, 18 Drawing Sheets

[FIG. 1]
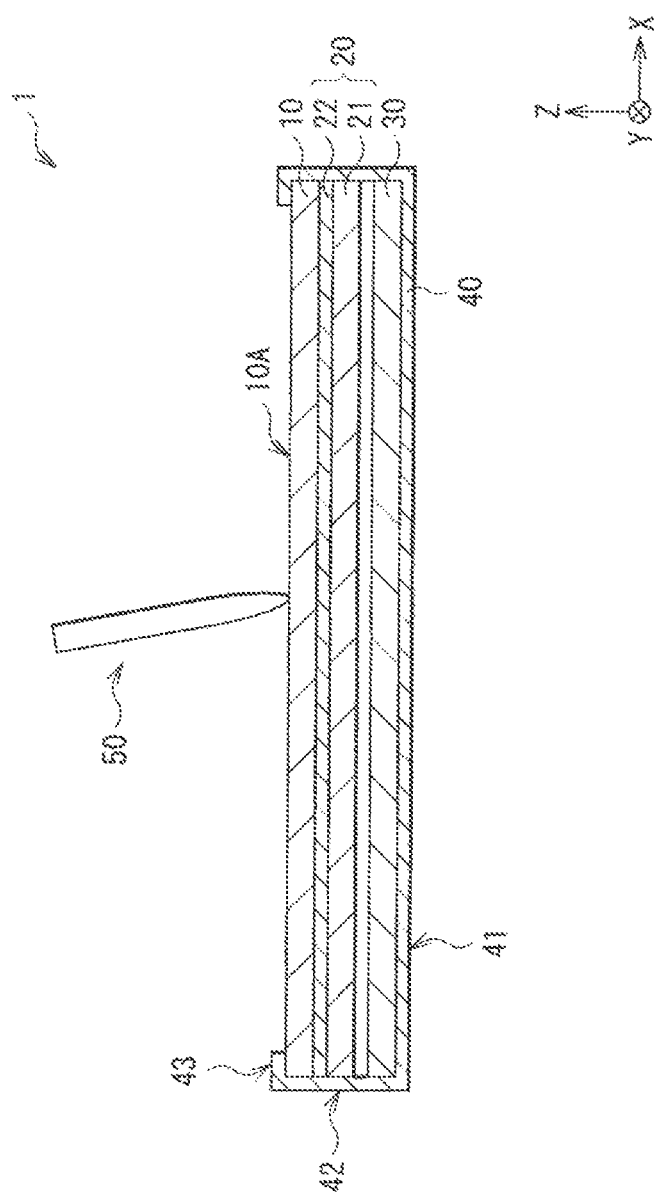

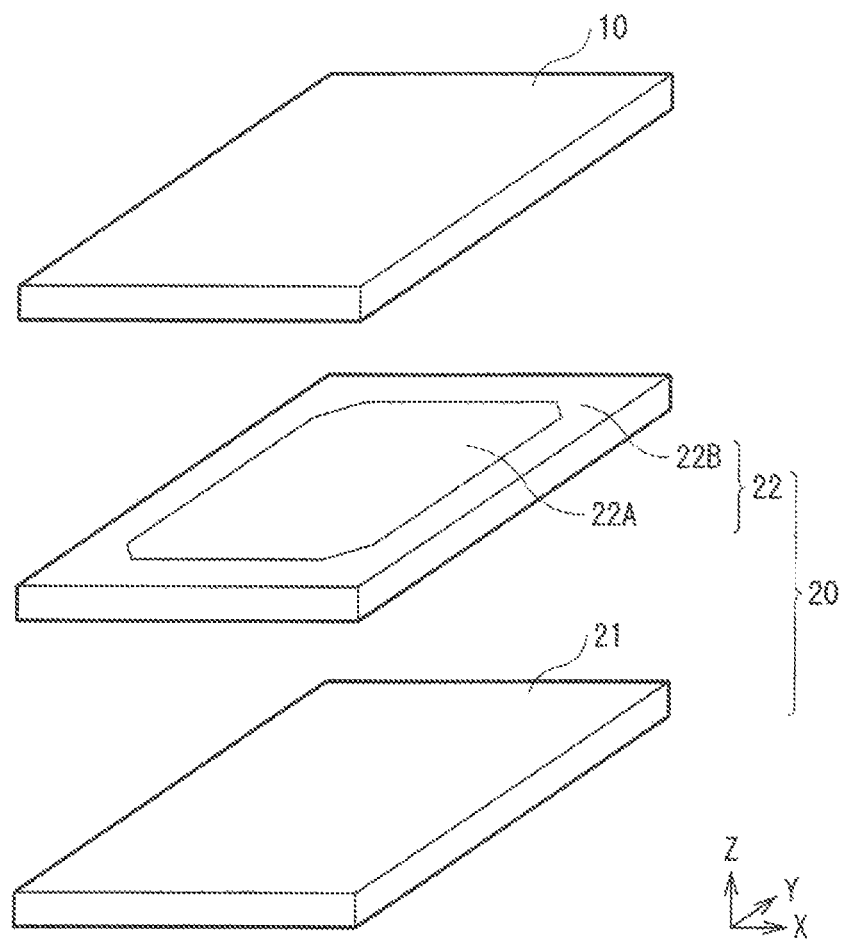
[FIG. 2]

[FIG. 3]
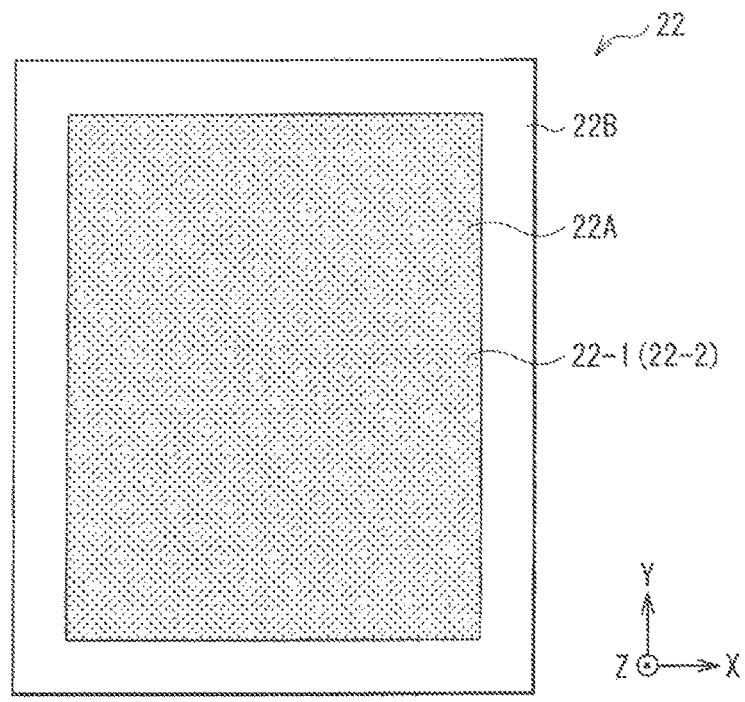
[FIG. 4]
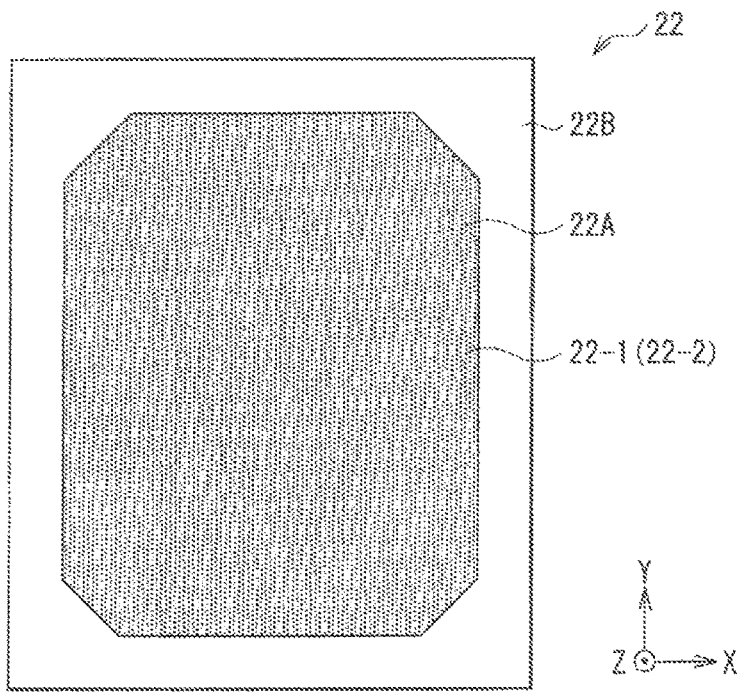

[ FIG. 6 ]
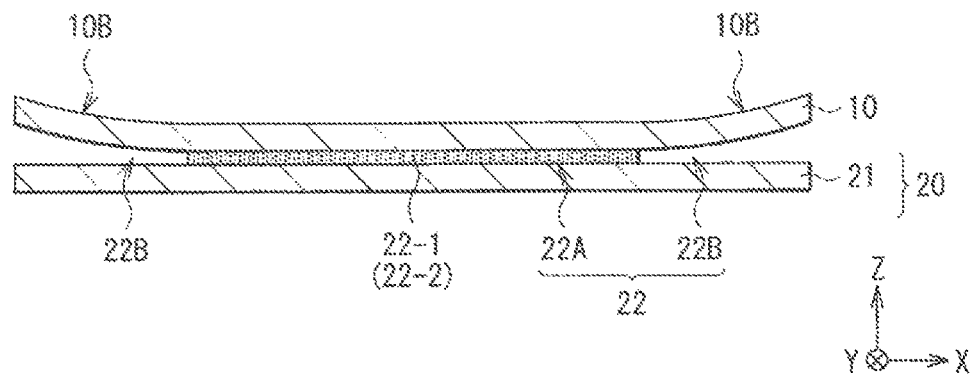
[ FIG. 6 ]
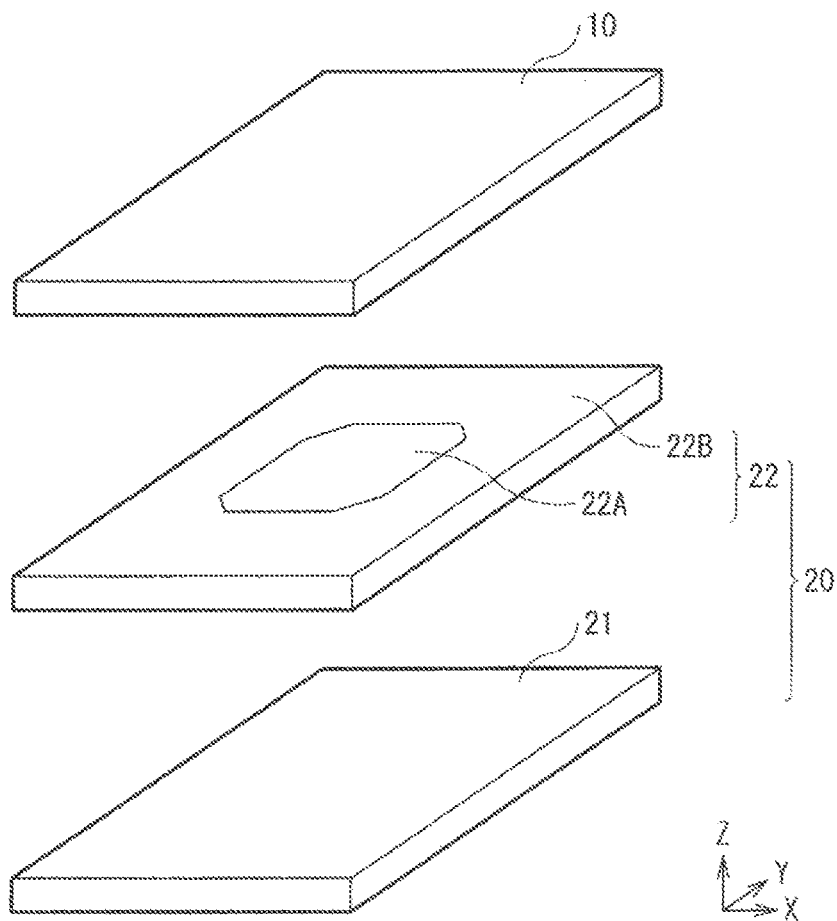

[ FIG. 7 ]
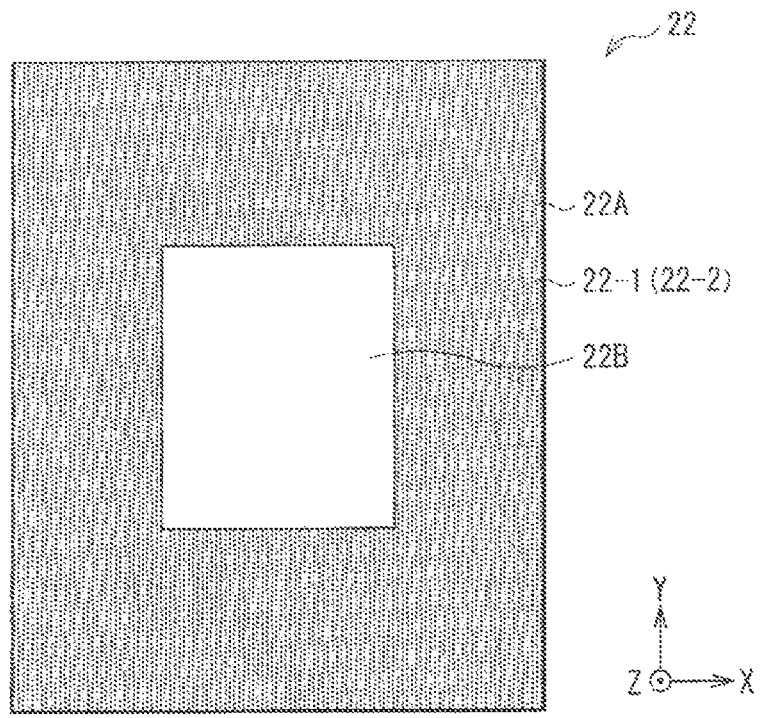
[ FIG. 8 ]
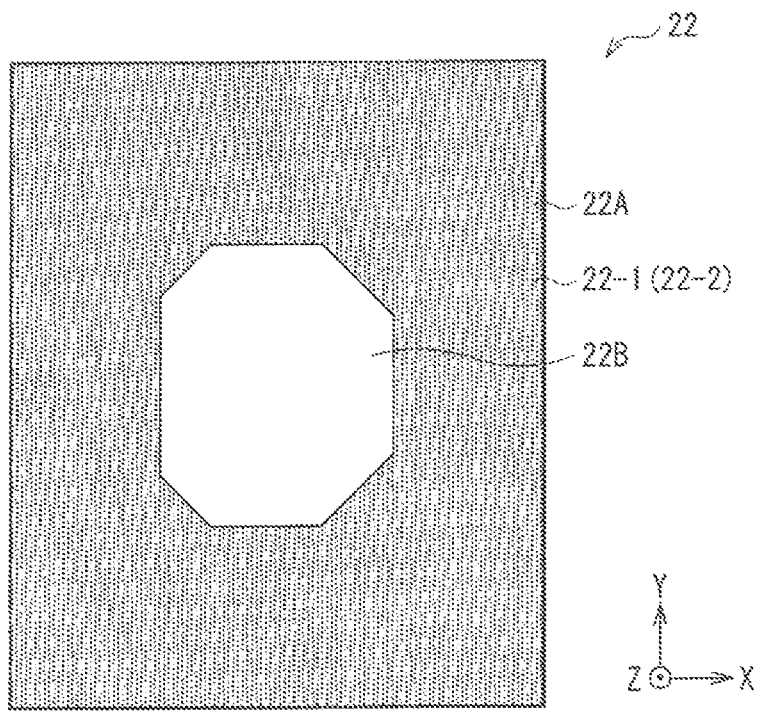

[ FIG. 9 ]
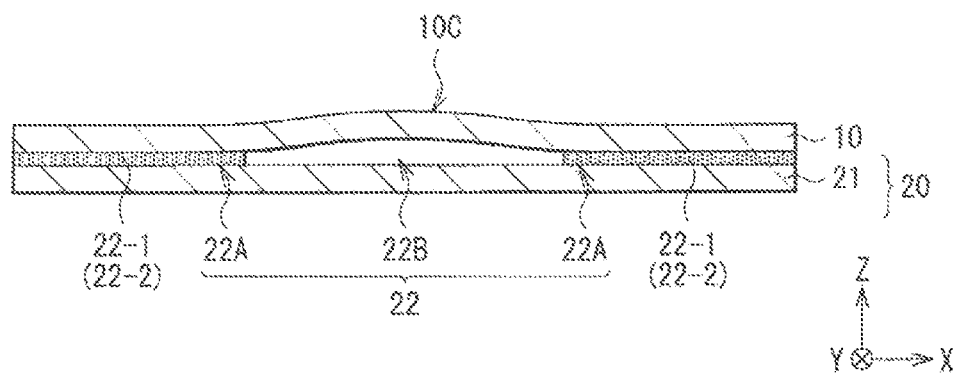
[ FIG. 10 ]
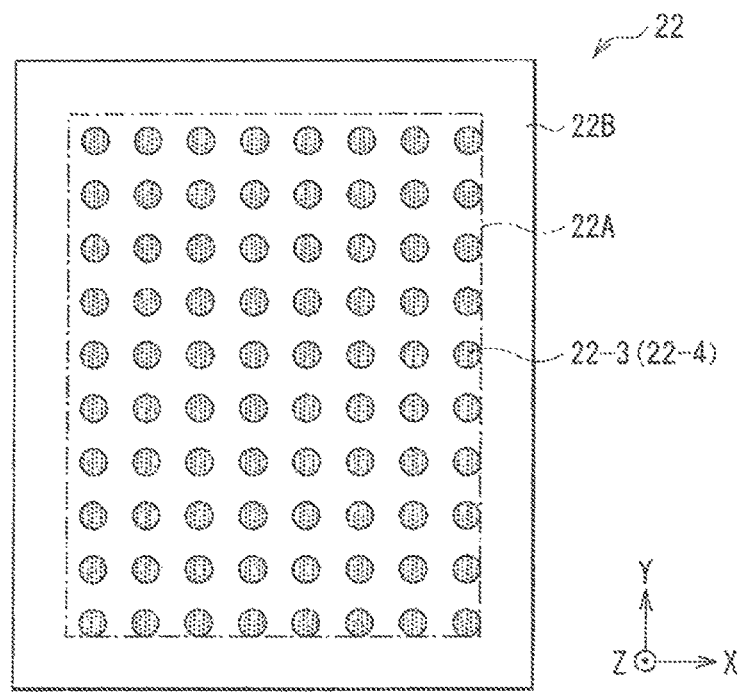

[ FIG. 11 ]
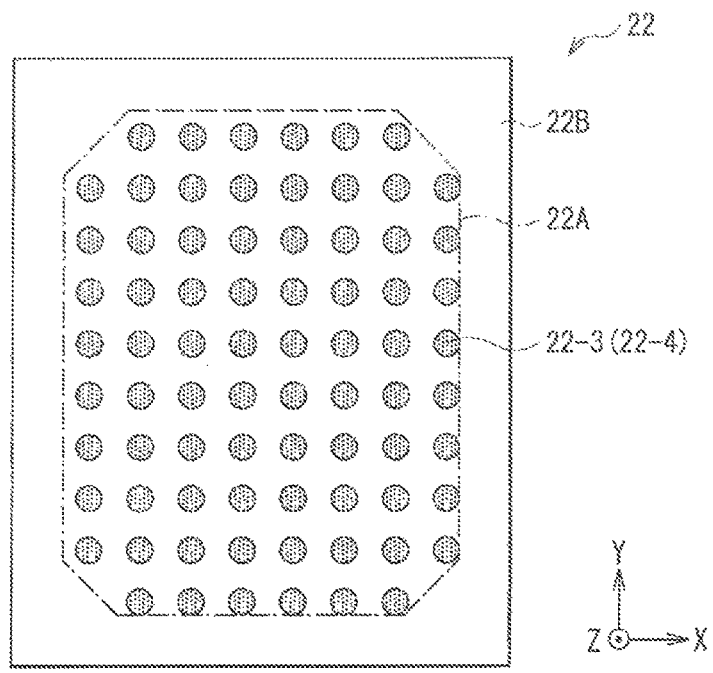
[ FIG. 12 ]
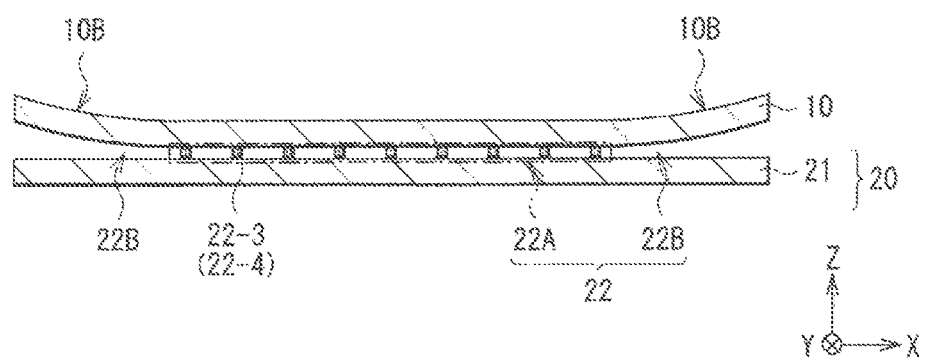

[ FIG. 13 ]
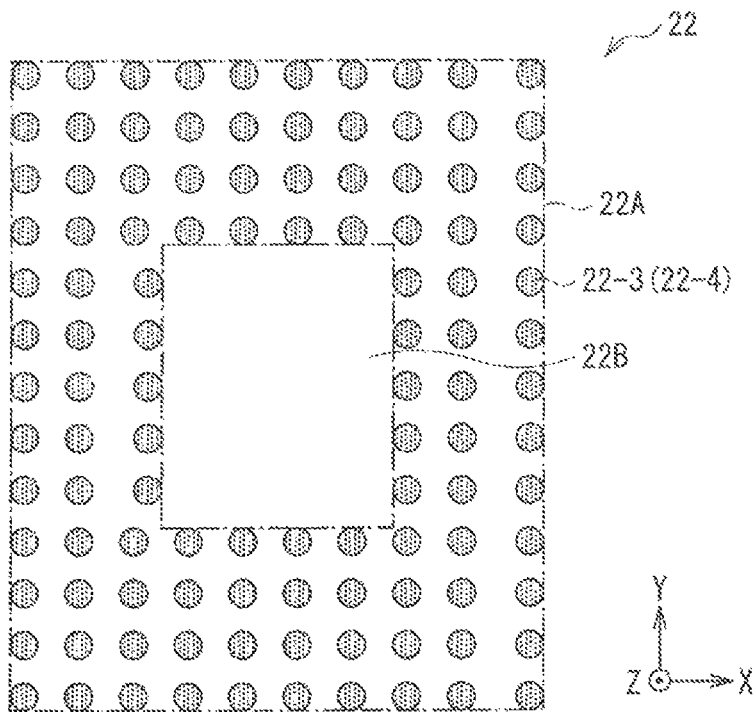
[ FIG. 14 ]
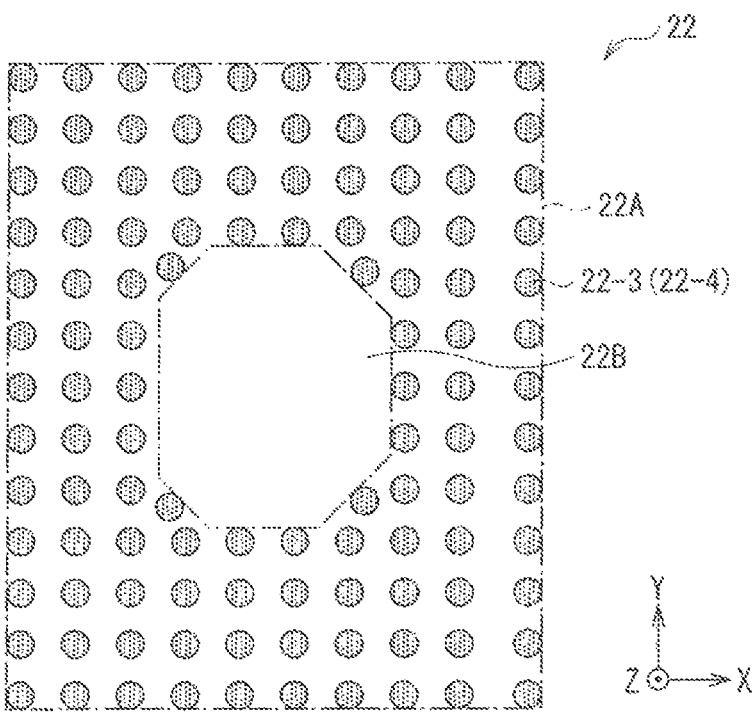

[ FIG. 15 ]
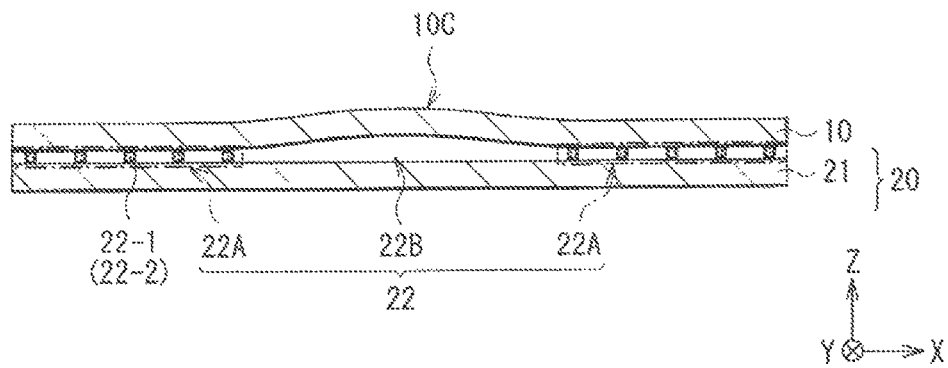
[ FIG. 16 ]
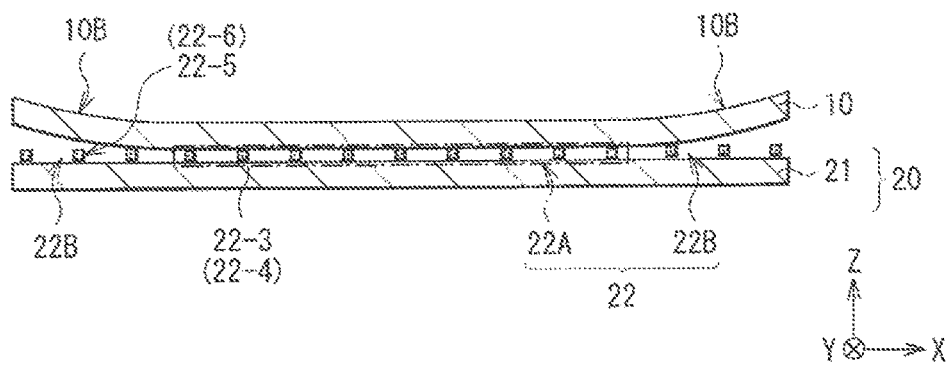
[ FIG. 17 ]
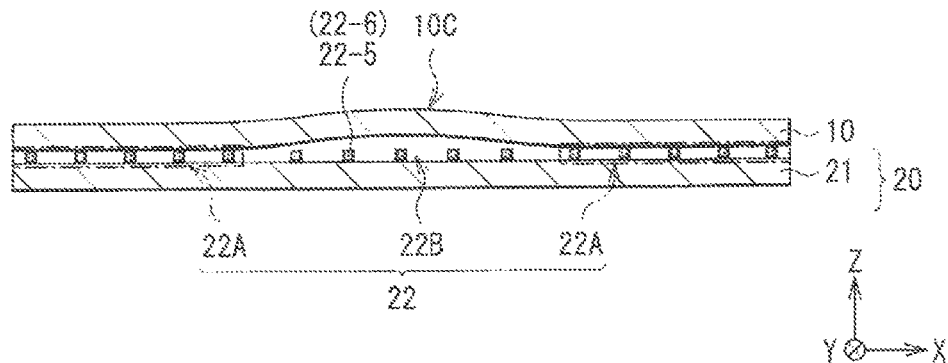

[FIG. 18]
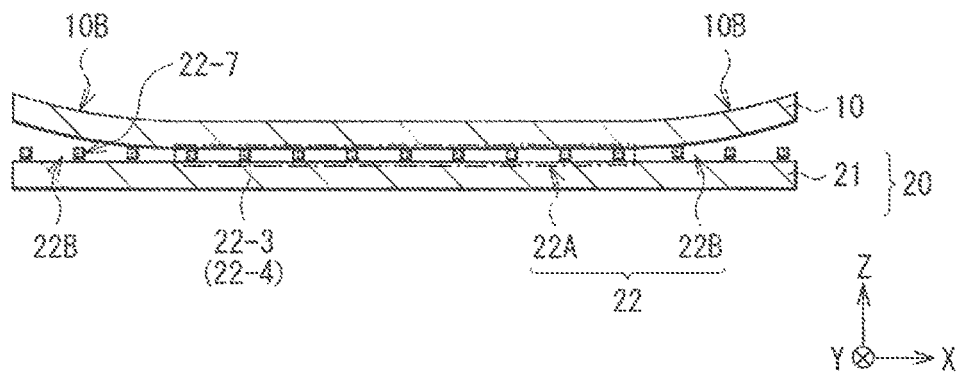
[FIG. 19]
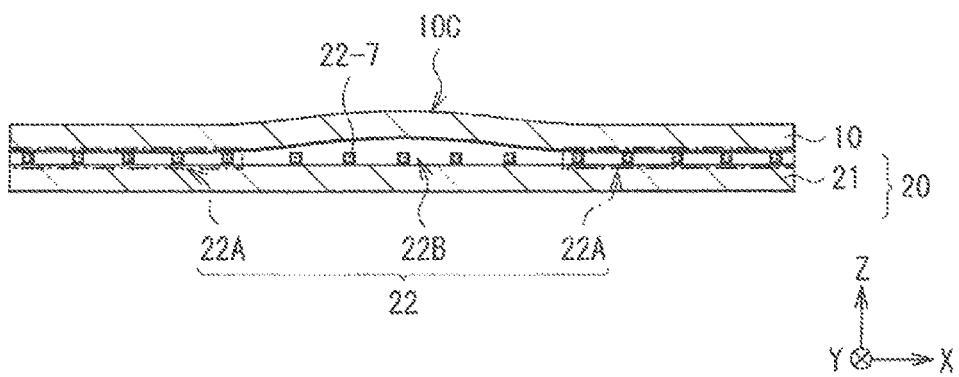
[FIG. 20]
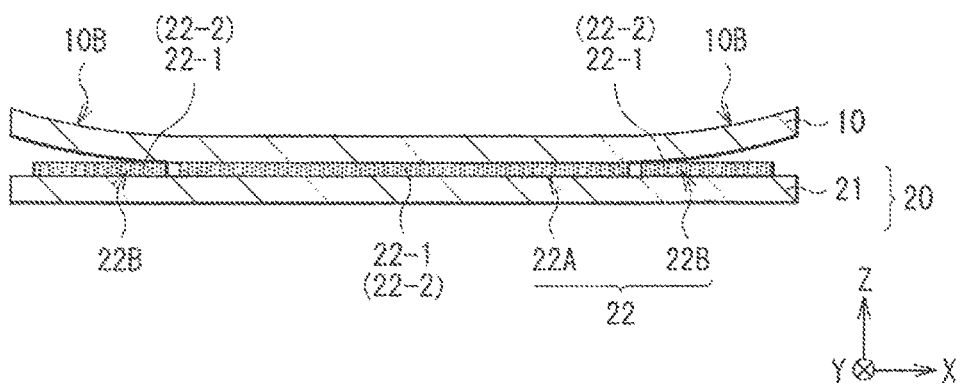

[FIG. 21]
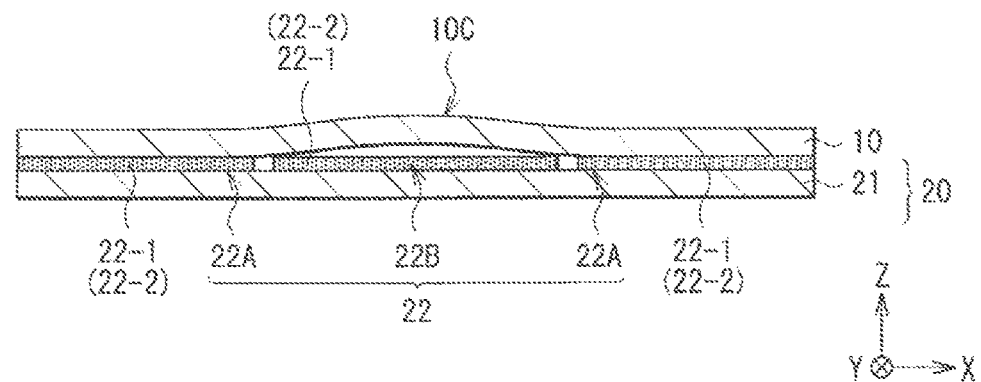
[FIG. 22]
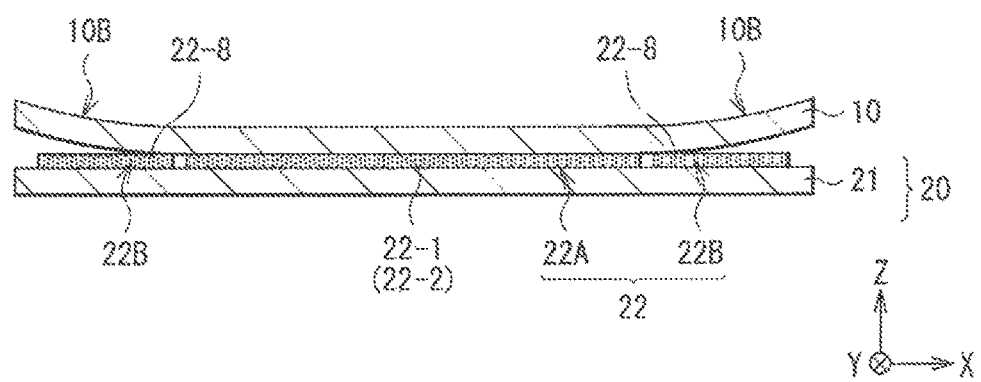
[FIG. 23]
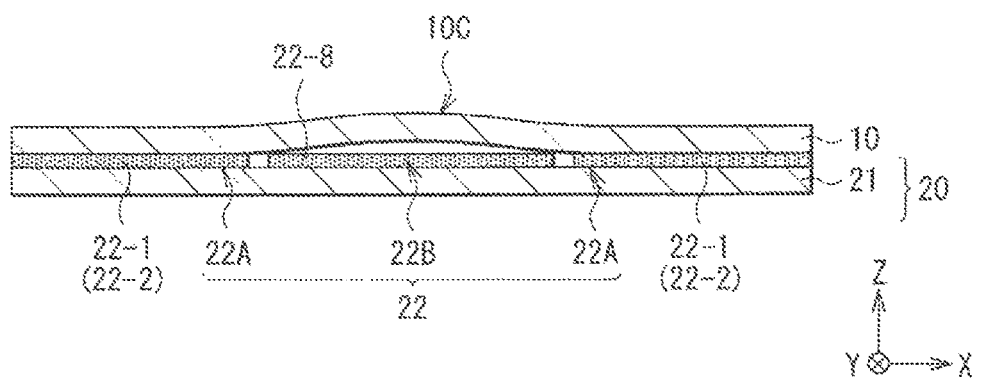

[FIG. 24A]
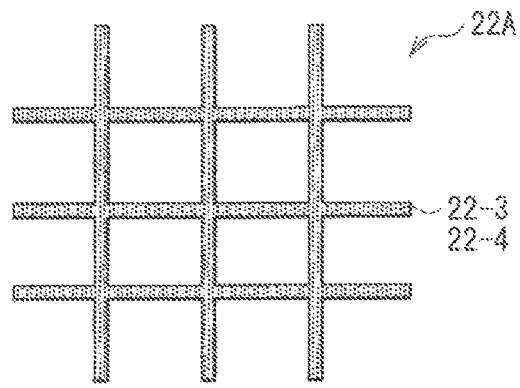
[FIG. 24B]
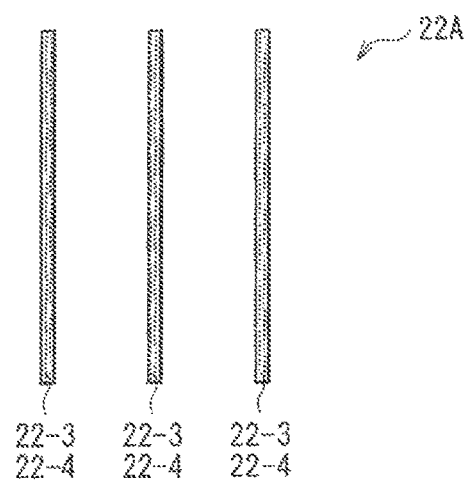
[FIG. 24C]
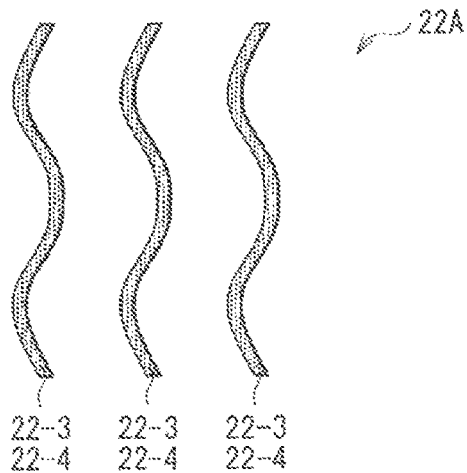

[FIG. 25A]
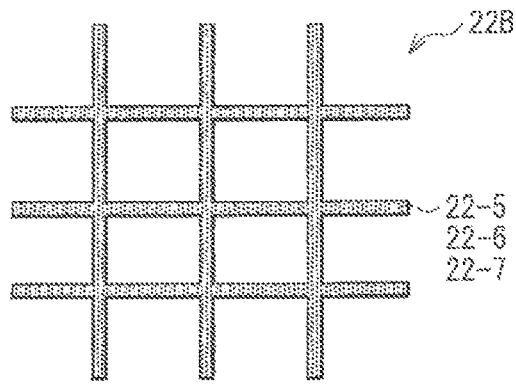
[FIG. 25B]
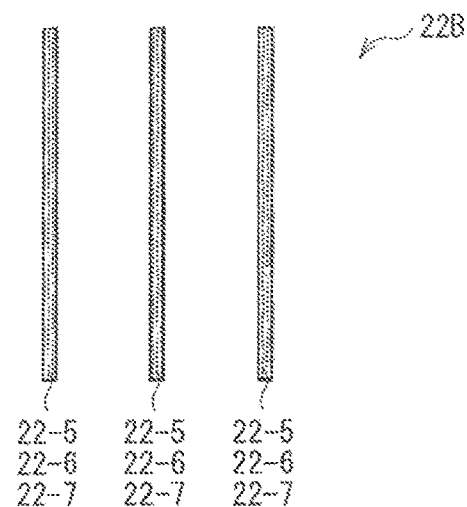
[FIG. 25C]
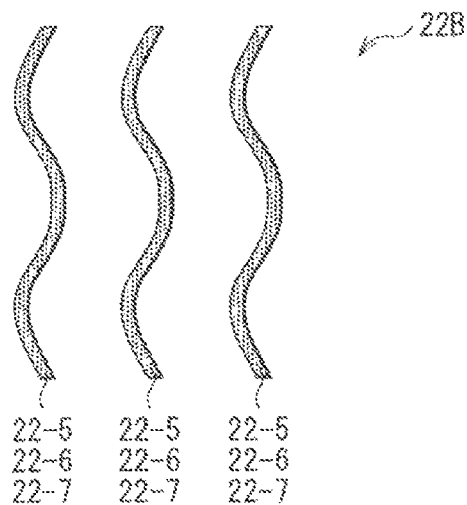

[FIG. 26]
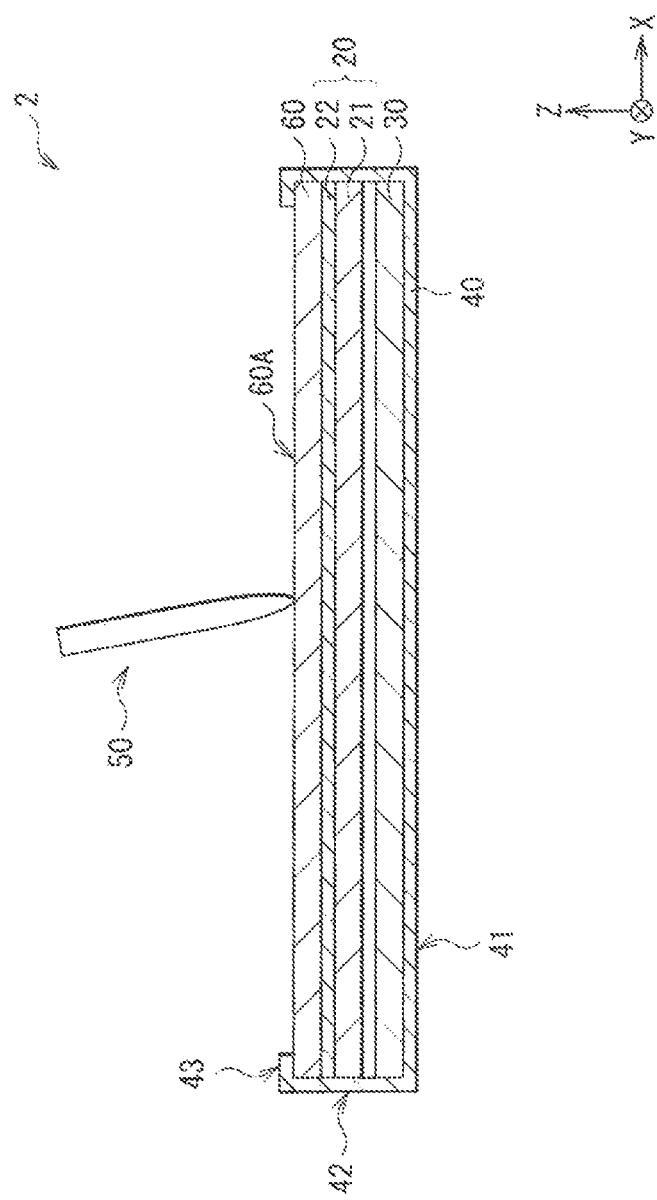

[FIG. 27]
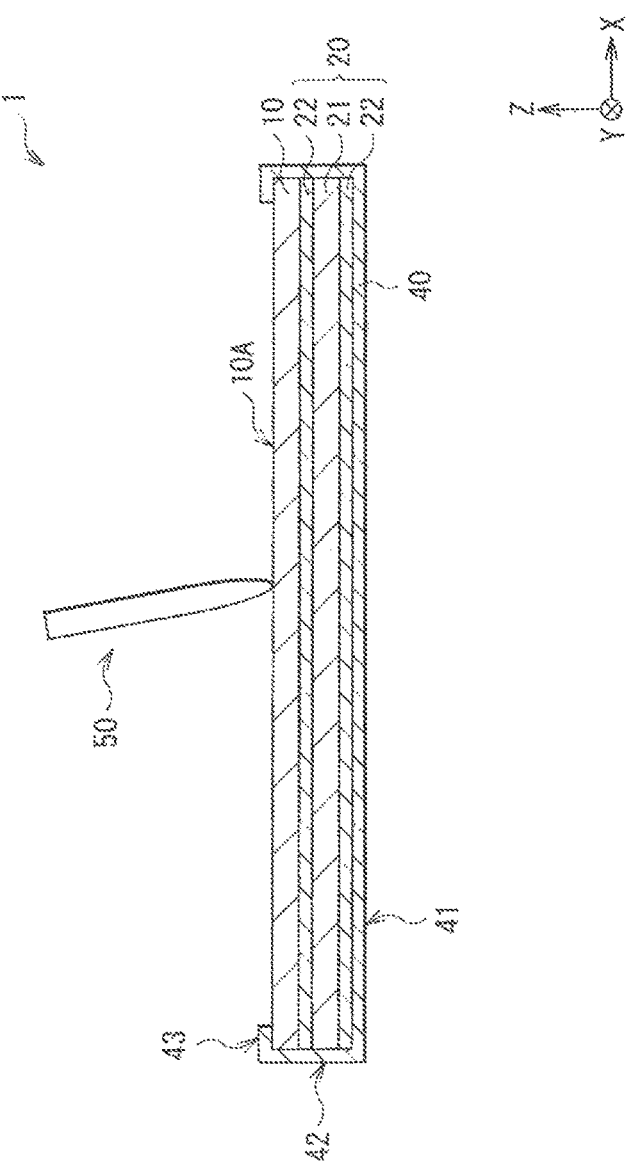

[ FIG. 26 ]
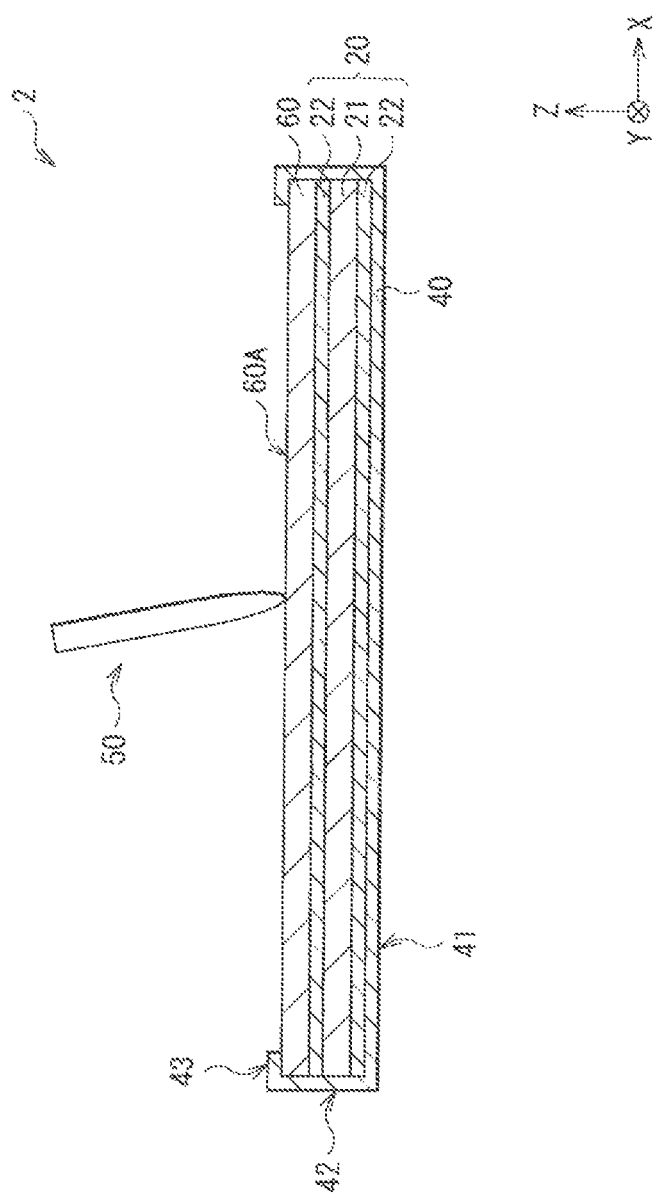

[FIG. 29]
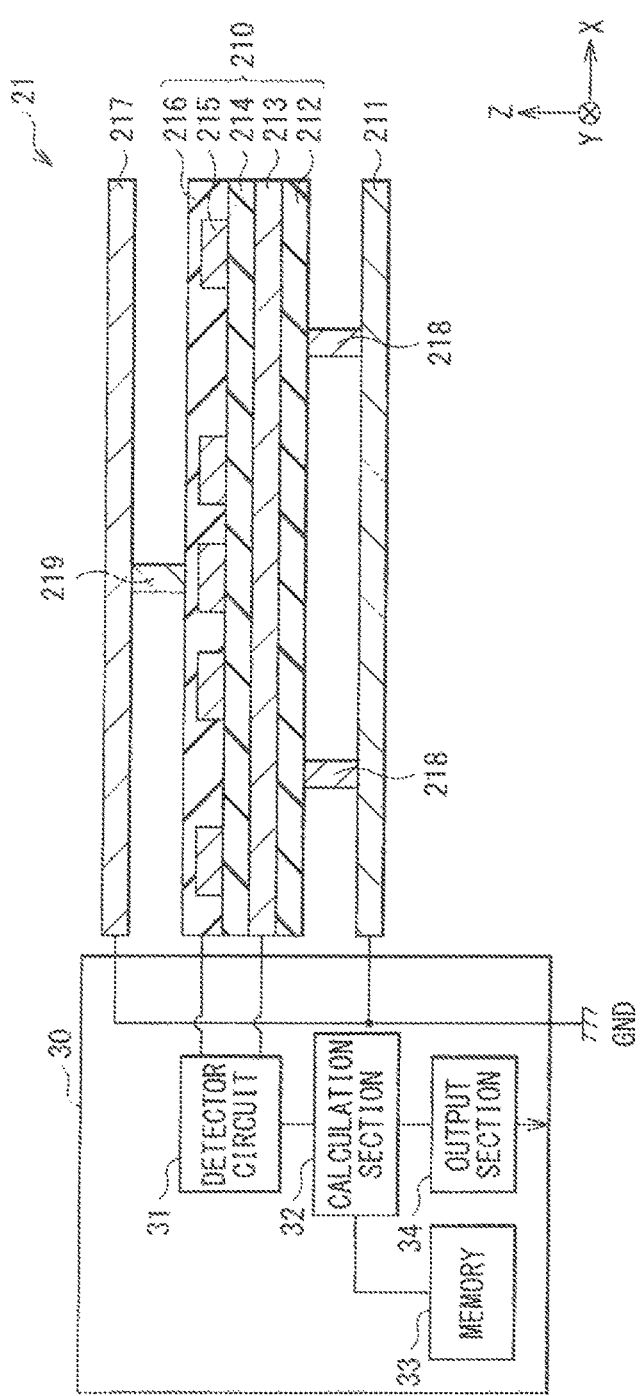

[FIG. 30]
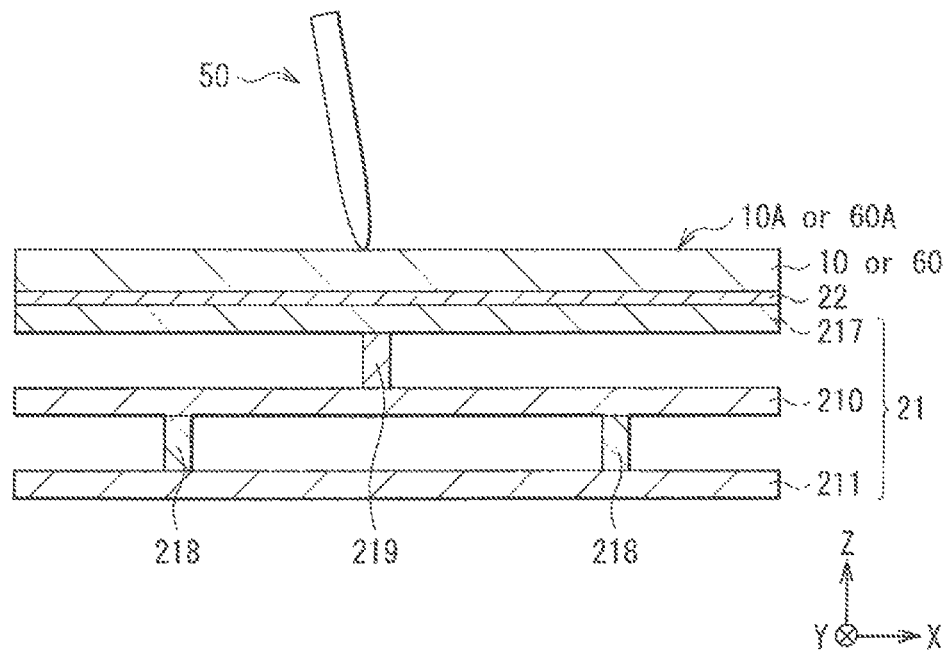
[FIG. 31]
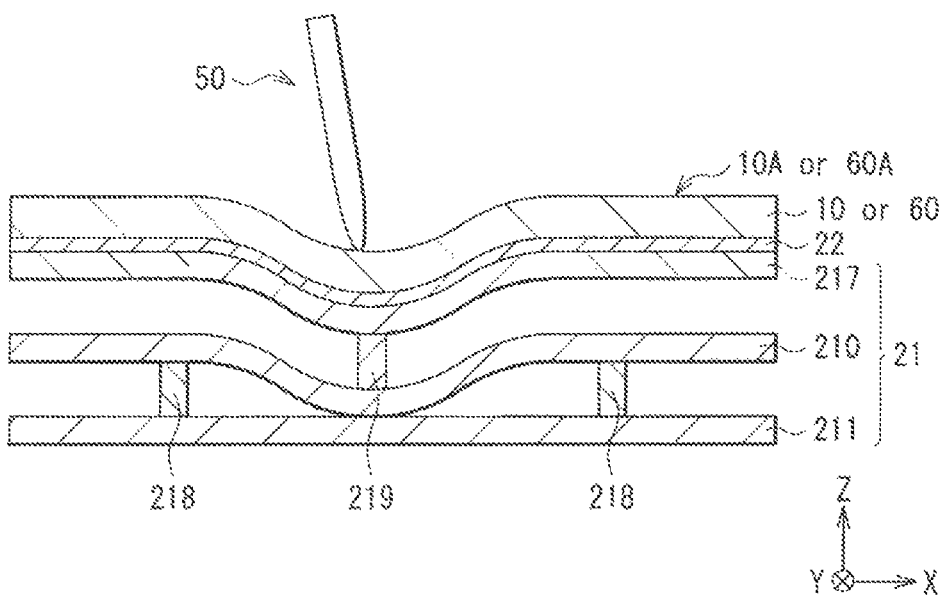

SENSOR DEVICE, DISPLAY UNIT, AND INPUT UNIT

TECHNICAL FIELD

The technology relates to a sensor device, and to a display unit and an input unit each provided with the sensor device.

BACKGROUND ART

In recent years, many bendable picture devices and supple and flexible devices such as a flexible display and an electronic paper have been developed. Associated therewith, for example, structures, substrates, and adhesives suitable for the flexible devices have been newly developed (for example, see PTL1).

CITATION LIST

Patent Literature

PTL 1: Japanese Unexamined Patent Application Publication No. 2012-243935

SUMMARY OF INVENTION

However, a thin substrate is used for the flexible device, this may frequently cause deflection of the substrate itself. When deflection occurs on the substrate, the deflection may adversely affect other functions inside the flexible device. In particular, when a sensor layer detecting contact to the substrate is provided, stress caused by the deflection of the substrate is applied to the sensor layer, which may disadvantageously result in deterioration of sensor characteristics.

It is therefore desirable to provide a sensor device that makes it possible to suppress deterioration in sensor characteristics caused by deflection of a substrate, and a display unit and an input unit each provided with the sensor device.

A sensor device according to an embodiment of the technology includes: a sensor layer provided at a position facing a surface, of a substrate having an operation surface, opposite to the operation surface, and configured to detect a contacted position or a pressed position on the operation surface; and a gap layer located in a gap between the substrate and the sensor layer. The gap layer includes a bonding region bonding the substrate to the sensor layer, and a relaxation region relaxing stress applied from the substrate to the sensor layer.

In the sensor device according to the embodiment of the technology, the bonding region bonding the substrate to the sensor layer and the relaxation region relaxing stress applied from the substrate to the sensor layer are provided between the substrate and the sensor device. Therefore, the stress applied from the substrate is relaxed by the relaxation region.

A display unit according to an embodiment of the technology is provided with a display panel including a display surface, and a sensor device provided on side of the display panel opposite to the display surface. The sensor device includes: a sensor layer provided at a position apart from and facing the display panel, and configured to detect a contacted position or a pressed position on the display surface; and a gap layer located in a gap between the display panel and the sensor layer. The gap layer includes a bonding region bonding the display panel to the sensor layer, and a relaxation region relaxing stress applied from the display panel to the sensor layer.

In the display unit according to the embodiment of the technology, the bonding region bonding the display panel to the sensor layer and the relaxation region relaxing stress applied from the display panel to the sensor layer are provided between a back surface of the display panel and the sensor layer. Therefore, the stress applied from the display panel is relaxed by the relaxation region.

An input unit according to an embodiment of the disclosure is provided with a substrate including an operation surface, and a sensor device provided on side of the substrate opposite to the operation surface. The sensor device includes: a sensor layer provided at a position apart from and facing the substrate, and configured to detect a contacted position or a pressed position on the operation surface; and a gap layer located in a gap between the substrate and the sensor layer. The gap layer includes a bonding region bonding the substrate to the sensor layer, and a relaxation region relaxing stress applied from the substrate to the sensor layer.

In the input unit according to the embodiment of the technology, the bonding region bonding the substrate to the sensor layer and the relaxation region relaxing stress applied from the substrate to the sensor layer are provided between a back surface of the substrate and the sensor layer. Therefore, the stress applied from the substrate to the sensor layer is relaxed by the relaxation region.

According to the sensor device, the display unit, and the input unit of the respective embodiments of the technology, stress applied from the substrate or the display panel to the sensor layer is relaxed by the relaxation region. This makes it possible to suppress deterioration in sensor characteristics caused by deflection of the substrate or the display panel. Note that effects achieved by the technology are not limited to those described here. Effects achieved by the technology may be one or more of effects described in the specification.

BRIEF DESCRIPTION OF DRAWINGS

FIG. 1 FIG. 1 is a diagram illustrating an example of a sectional structure of a display unit according to a first embodiment of the technology.

FIG. 2 is a diagram illustrating an example of a perspective configuration of a display panel and a sensor device of FIG. 1.

FIG. 3 is a diagram illustrating an example of a planar configuration of a gap layer of FIG. 2.

FIG. 4 is a diagram illustrating an example of the plane configuration of the gap layer of FIG. 2.

FIG. 5 is a diagram illustrating a state where curvature occurs at an end of the display panel of FIG. 1.

FIG. 6 is a diagram illustrating a modification of the perspective configuration of the display panel and the sensor device of FIG. 1.

FIG. 7 is a diagram illustrating an example of a planar configuration of a gap layer of FIG. 6.

FIG. 8 is a diagram illustrating an example of the planar configuration of the gap layer of FIG. 6.

FIG. 9 is a diagram illustrating a state where curvature occurs at a center part of the display panel of FIG. 1.

FIG. 10 is a diagram illustrating a modification of the planar configuration of the gap layer of FIG. 3.

FIG. 11 is a diagram illustrating a modification of the planar configuration of the gap layer of FIG. 4.

FIG. 12 is a diagram illustrating a state where curvature occurs at an end of the display panel of FIG. 1 in a display unit provided with the gap layer of FIG. 10 or FIG. 11.

FIG. 13 is a diagram illustrating a modification of the planar configuration of the gap layer of FIG. 7.

FIG. 14 is a diagram illustrating a modification of the planar configuration of the gap layer of FIG. 8.

FIG. 15 is a diagram illustrating a state where curvature occurs at a central part of the display panel of FIG. 1 in a display unit provided with the gap layer of FIG. 13 or FIG. 14.

FIG. 16 is a diagram illustrating a state where curvature occurs at an end of the display panel of FIG. 1 in a display unit provided with a modification of the gap layer of FIG. 10 or FIG. 11.

FIG. 17 is a diagram illustrating a state where curvature occurs at a central part of the display panel of FIG. 1 in a display unit provided with a modification of the gap layer of FIG. 13 or FIG. 14.

FIG. 18 is a diagram illustrating a state where curvature occurs at an end of the display panel of FIG. 1 in a display unit provided with a modification of the gap layer of FIG. 16.

FIG. 19 is a diagram illustrating a state where curvature occurs at a central part of the display panel of FIG. 1 in a display unit provided with a modification of the gap layer of FIG. 17.

FIG. 20 is a diagram illustrating a state where curvature occurs at an end of the display panel of FIG. 1 in a display unit provided with a modification of the gap layer of FIG. 5.

FIG. 21 is a diagram illustrating a state where curvature occurs at a central part of the display panel of FIG. 1 in a display unit provided with a modification of the gap layer of FIG. 9.

FIG. 22 is a diagram illustrating a state where curvature occurs at an end of the display panel of FIG. 1 in a display unit provided with a modification of the gap layer of FIG. 20.

FIG. 23 is a diagram illustrating a state where curvature occurs at a central part of the display panel of FIG. 1 in a display unit provided with a modification of the gap layer of FIG. 21.

FIG. 24A is a diagram illustrating a modification of a planar layout of an adhesive part and a bonding layer in a bonding region.

FIG. 24B is a diagram illustrating a modification of the planar layout of the adhesive part and the bonding layer in the bonding region.

FIG. 24C is a diagram illustrating a modification of the planar layout of the adhesive part and the bonding layer in the bonding region.

FIG. 25A is a diagram illustrating a modification of a planar layout of an adhesive part, a bonding layer, and a non-adhesive layer in a relaxation region.

FIG. 25B is a diagram illustrating a modification of the planar layout of the adhesive part, the bonding layer, and the non-adhesive layer in the relaxation region.

FIG. 25C is a diagram illustrating a modification of the planar layout of the adhesive part, the bonding layer, and the non-adhesive layer in the relaxation region.

FIG. 26 is a diagram illustrating an example of a sectional structure of an input unit according to a second embodiment of the technology.

FIG. 27 is a diagram illustrating a modification of the sectional structure of the display unit of FIG. 1.

FIG. 28 is a diagram illustrating a modification of the sectional structure of the input unit of FIG. 26.

FIG. 29 is a diagram illustrating an example of a sectional structure of a sensor device of any of FIG. 1, FIG. 26, FIG. 27, and FIG. 28 together with an example of an internal configuration of a driver.

FIG. 30 is a diagram illustrating an example of an action of the sensor device of FIG. 29.

FIG. 31 is a diagram illustrating an example of the action of the sensor device of FIG. 29.

DESCRIPTION OF EMBODIMENTS

Some embodiments of the technology are described in detail below with reference to drawings. Note that description is given in the following order.
1. First Embodiment (display unit)
   An example in which a gap layer is provided between a sensor layer and a display panel
   An example in which a relaxation region is provided at an edge of the gap layer
   An example in which a sheet adhesive layer or a sheet bonding layer is provided at a center part of the gap layer
2. Modifications
   An example in which the relaxation region is provided at a center part of the gap layer
   An example in which a dot-like, lattice-like, or stripe-like adhesive part or bonding part is provided
   An example in which a non-adhesive part or a non-adhesive layer is provided in the relaxation region
3. Second Embodiment (input unit)
   An example in which a substrate is provided in place of the display panel in the display unit of the above-described embodiment
4. Modification Common to Embodiments
   An example in which the gap layer is also provided between the sensor layer and a housing
5. Specific Examples of Sensor Layer 1. First Embodiment

[Configuration]
FIG. 1 illustrates an example of a sectional structure of a display unit 1 according to a first embodiment of the technology. The display unit 1 displays a picture on a display surface 10A that is an operation surface. For example, the display unit 1 may include a display panel 10, a sensor device 20, a driver 30, a housing 40, and a pen 50. The display panel 10 corresponds to a specific but non-limiting example of "substrate" in the technology.

The display panel 10 displays a picture on the display surface 10A, and may be configured of, for example, a liquid crystal panel, an organic electro-luminescence (EL) panel, or an electrophoretic panel. The display panel 10 has flexibility and may include, for example, a flexible resin film or a flexible sheet glass. The sensor device 20 detects a position on the display surface 10A contacted or pressed by, for example, the pen 50. The sensor device 20 may output a detection result (a detection signal) to the driver 30. Note that the sensor device 20 is described in detail later. The driver 30 may apply a voltage to the display panel 10 to display a picture on the display surface 10A. The driver 30 also may apply a voltage to the sensor device 20 to drive the sensor device 20 and to receive the detection signal from the sensor device 20. The driver 30 further may generate a voltage based on the received detection signal, and then apply the generated voltage to the display panel 10 to change the display of the display surface 10A. The driver 30 may generate an image signal based on the received detection signal and output the image signal to outside.

The housing 40 may protect the display panel 10, the sensor device 20, and the driver 30. The housing 40 may further fix the display panel 10 and the sensor device 20 to the housing 40. The housing 40 may include, for example, a bottom surface part 41, a side surface part 42, and an upper surface part 43. The bottom surface part 41 may face a back surface of the sensor device 20. The side surface part 42 may face a side surface of the display panel 10 and a side surface of the sensor device 20. The upper surface part 43 may face an edge of an upper surface of the display panel 10. For example, an end of the display panel 10 and an end of the sensor device 20 may be sandwiched between the bottom surface part 41 and the upper surface part 43. The pen 50 may come into contact with the display surface 10A or press the display surface 10A. The sensor device 20 detects a position on the display surface 10A contacted or pressed by the pen 50. Note that the pen 50 may be omitted. In this case, for example, a finger may be used in place of the pen 50.

Next, the sensor device 20 is described in detail. The sensor device 20 is disposed at a position facing a surface opposite to the display surface 10A of the display panel 10. In other words, the sensor device 20 is not provided on the display surface 10A. The sensor device 20 may include, for example, a sensor layer 21 and a gap layer 22. The sensor layer 21 is disposed at a position facing the surface opposite to the display surface 10A of the display panel 10. The gap layer 22 is located in a gap between the display panel 10 and the sensor layer 21. The sensor layer 21 detects a position on the display surface 10A contacted or pressed by, for example, the pen 50, and may be configured of, for example, a detector of an electrostatic capacitance type, a resistance film type, or a magnetic resistance type. The sensor layer 21 may have flexibility, and for example, include one or a plurality of flexible resin layers or one or a plurality of flexible electrically-conductive layers.

FIG. 2 illustrates an example of a perspective configuration of the display panel 10 and the sensor device 20. As mentioned above, the gap layer 22 is located in the gap between the display panel 10 and the sensor layer 21. The gap layer 22 includes a bonding region 22A and a relaxation region 22B. The bonding region 22A has a function of bonding the display panel 10 and the sensor layer 21 to each other. The relaxation region 22B has a function of relaxing stress applied from the display panel 10 to the sensor layer 21.

FIG. 3 and FIG. 4 each illustrate an example of a planar configuration of the gap layer 22. The bonding region 22A is disposed at a position facing a center part of the sensor layer 21. For example, the bonding region 22A may have a rectangular shape as illustrated in FIG. 3, or a shape in which four corners of a rectangle are cut out as illustrated in FIG. 4. The shape of bonding region 22A is not limited to those mentioned above, and for example, may have a circular shape or an ellipsoidal shape. The bonding region 22A may be formed of a sheet adhesive layer 22-1 or a sheet bonding layer 22-2. Note that the bonding region 22A may be formed of a plurality of sheet adhesive layers 22-1 or a plurality of sheet bonding layers 22-2.

Non-limiting examples of the material of the adhesive layer 22-1 may include an acrylic adhesive, an ethylene-vinyl acetate copolymer, a natural rubber-based adhesive, a synthetic rubber-based adhesive such as polyisobutylene, butyl rubber, a styrene-butylene-styrene copolymer, and a styrene-isoprene-styrene block copolymer, a polyurethane-based adhesive, a polyester-based adhesive, an epoxy-based adhesive, and a silicon-based adhesive. For example, a material similar to the material described as the material of the adhesive layer 22-1 may be used for the bonding layer 22-2. Non-limiting examples of a method of curing the above-mentioned materials may include ultraviolet curing, electron beam curing, radiation curing, and dry curing. The adhesive layer 22-1 and the bonding layer 22-2 each may have a thickness of, for example, about 0.5 μm to about 500 μm both inclusive.

The relaxation region 22B may be disposed at a position facing an edge of the sensor layer 21. The relaxation region 22B is disposed at an outer periphery of the bonding region 22A. For example, as illustrated in FIG. 3 and FIG. 4, the relaxation region 22B may have a frame shape in which a center part of a rectangular sheet is replaced by the bonding region 22A. The relaxation region 22B may be configured of clearance.

FIG. 5 illustrates a state where curvature occurs at an end of the display panel 10. FIG. 5 illustrates a state where curvature occurs at the end of the display panel 10 in a direction apart from the sensor layer 21 when the display panel 10 is not tightened by the housing 40. In FIG. 5, a part where the curvature occurs is denoted by a curved part 10B. It may be assumed that, when the display panel 10 is not tightened by the housing 40, the curved part 10B exists at the end of the display panel 10. At this time, the relaxation region 22B (clearance in this case) may be disposed in a part or the entire of the region facing the curved part 10B. In other words, the relaxation region 22B may be provided according to the position where the curved part 10B is generated. The bonding region 22A (the adhesive layer 22-1 or the bonding layer 22-2 in this case) may be disposed in a region facing a region of the display panel 10 that does not face the relaxation region 22B, and for example, may be disposed in a region facing a part other than the curved part 10B of the display panel 10.

When the curved part 10B has a frame shape, the relaxation region 22B also may have a frame shape. When the curvature of the curved part 10B is particularly large at the four corners of the display panel 10, a width of the relaxation region 22B at each of the parts facing the respective four corners of the display panel 10 may be preferably larger than a width of the relaxation region 22B at a pan facing a part other than the four corners of the display panel 10. The term "a width of the relaxation region 22B" indicates a width of the frame when the relaxation region 22B has the frame shape. At this time, for example, as illustrated in FIG. 4, the bonding region 22A has a shape in which four corners of a rectangle are cut out.

A percentage of the relaxation region 22B in the gap layer 22 may be preferably in a range from 10% to 30% both inclusive by taking into consideration the result of static measurement and dynamic measurement in the following table 1. Accordingly, the percentage of the curved part 10B in the display panel 10 may be preferably made equal to or lower than 30% so that the percentage of the relaxation region 22B in the gap layer 22 satisfies the above-described condition. The static measurement indicates measurement of in-plane variation of the sensor sensitivity in a state where the display surface 10A is not contacted or not pressed by, for example, the pen 50. The dynamic measurement indicates measurement of in-plan variation of the sensor sensitivity in a state where predetermined pressure is applied to the entire display surface 10A. In table 1, x (cross) indicates the in-plane variation of 15% or higher, Δ (triangle) indicates the in-plane variation of 5% or higher and lower than 15%, and ○ (white circle) indicates the in-plane variation of lower than 5%.

TABLE 1

| Percentage of Relaxation Region 22B (%) | Measurement Condition | |
|---|---|---|
| | Static Measurement | Dynamic Measurement |
| 0 | x (abnormality of 40%) | x |
| 10 | Δ (abnormality of 5%) | Δ |
| 30 | ○ (0%) | ○ |
| >50 | ○ (0%) | x (abnormality in sensitivity) |

[Effects]

Next, effects of the display unit 1 according to the present embodiment are described. In the present embodiment, the gap layer 22 including the bonding region 22A and the relaxation region 22B is provided between the display panel 10 and the sensor layer 21. In the case where the display panel 10 is not tightened by the housing 40, when the curved part 10B may exist at the end of the display panel 10, the relaxation region 22B is disposed in a part or the entire of the region facing the curved part 10B. In contrast, the bonding region 22A is disposed in a region facing a region of the display panel 10 that does not face the relaxation region 22B. This makes it possible to relax stress applied from the curved part 10B to the sensor layer 21 by the relaxation region 22B while fixing the display panel 10 and the sensor layer 21 to each other by the bonding region 22A. It is therefore possible to suppress deterioration in sensor characteristics caused by deflection of the display panel 10.

2. Modifications

Next, modifications of the display unit 1 according to the above-described embodiment are described.

[Modification 1]

FIG. 6 illustrates a modification of a perspective configuration of the display panel 10 and the sensor device 20. FIG. 7 and FIG. 8 each illustrate an example of a planar configuration of the gap layer 22 of FIG. 6. In the present modification, the bonding region 22A is disposed at a position facing the end of the sensor layer 21. For example, as illustrated in FIG. 7 and FIG. 8, the bonding region 22A may have a frame shape in which a center part of the rectangular sheet is removed. The bonding region 22A may be formed of the sheet adhesive layer 22-1 or the sheet bonding layer 22-2. Note that the bonding region 22A may be formed of a plurality of sheet adhesive layers 22-1 or a plurality of sheet bonding layers 22-2.

The relaxation region 22B may be disposed at a position facing the center part of the sensor layer 21. The relaxation region 22B may be disposed in a region surrounded by the bonding region 22A. For example, the relaxation region 22B may have a rectangular shape as illustrated in FIG. 7 or a shape in which four corners of a rectangle are cut out as illustrated in FIG. 8. The shape of the bonding region 22A is not limited to those mentioned above, and alternatively for example, may be a circular shape or an ellipsoidal shape.

FIG. 9 illustrates a state where curvature occurs at the center part of the display panel 10, FIG. 9 illustrates a state where curvature occurs at the center part of the display panel 10 in the direction apart from the sensor layer 21 when the display panel 10 is not tightened by the housing 40. In FIG. 9, a part where the curvature occurs is denoted by a curved part 10C. It may be assumed that, when the display panel 10 is not tightened by the housing 40, the curved part 10C exists at the center part of the display panel 10. At this time, the relaxation region 22B (clearance in this case) may be disposed in a part or the entire of the region facing the curved part 10C. In other words, the relaxation region 22 is disposed according to the position where the curved part 10C is generated. The bonding region 22A (the adhesive layer 22-1 or the bonding layer 22-2 in this case) may be disposed in a region facing a region of the display panel 10 that does not face the relaxation region 22B, and for example, may be disposed in a region facing a part other than the curved part 10C of the display panel 10.

Next, effects of the display unit 1 according to the present modification are described. In the present modification, the gap layer 22 including the bonding region 22A and the relaxation region 22B is provided between the display panel 10 and the sensor layer 21. In the case where the display panel 10 is not tightened by the housing 40, when the curvature 10C may exist at the center part of the display panel 10, the relaxation region 22B is disposed in a part or the entire of the region facing the curved part 10C. In contrast, the bonding region 22A is disposed in a region facing a region of the display panel 10 that does not face the relaxation region 22B. This makes it possible to relax stress applied from the curved part 10B to the sensor layer 21 by the relaxation region 22B while fixing the display panel 10 and the sensor layer 21 to each other by the bonding region 22A. It is therefore possible to suppress deterioration in sensor characteristics caused by deflection of the display panel 10.

[Modification 2]

FIG. 10 illustrates a modification of a planar configuration of the gap layer 22 of FIG. 3. FIG. 11 illustrates a modification of a planar configuration of the gap layer 22 of FIG. 4. In the present modification, the relaxation region 22 may be formed of clearance. Further, the bonding region 22A may include a plurality of dot-like adhesive parts 22-3 or a plurality of dot-like bonding parts 22-4. Each dot may have, for example, a columnar shape or a prism shape. The plurality of adhesive parts 22-3 may be arranged in a matrix in plane. The plurality of bonding parts 22-4 may be arranged in a matrix in plane. A material similar to the material described as the material of the adhesive layer 22-1 may be used for the adhesive part 22-3 and the bonding part 22-4. The adhesive part 22-3 and the bonding part 22-4 each may have a thickness of, for example, about 0.5 μm to about 500 μm both inclusive.

FIG. 12 illustrates a state where curvature occurs at the end of the display panel 10. FIG. 12 illustrates a state where curvature occurs at the end of the display panel 10 in the direction apart from the sensor layer 21 when the display panel 10 is not tightened by the housing 40. It may be assumed that, when the display panel 10 is not tightened by the housing 40, the curved part 10B exists at the end of the display panel 10. At this time, the relaxation region 22B (clearance in this case) may be disposed in a part or the entire of the region facing the curved part 10B. In other words, the relaxation region 22B may be provided according to the position where the curved part 10B is generated. The bonding region 22A (the plurality of adhesive parts 22-3 or the plurality of bonding parts 22-4 in this case) may be disposed in a region facing a region of the display panel 10 that does not face the relaxation region 22B, and for example, may be disposed in a region facing a part other than the curved part 10B of the display panel 10.

Next, effects of the display unit 1 according to the present modification are described. In the present modification, the gap layer 22 including the bonding region 22A and the relaxation region 22B is provided between the display panel 10 and the sensor layer 21, as with the foregoing embodiment. This makes it possible to relax stress applied from the curved part 10B to the sensor layer 21 by the relaxation region 22B while fixing the display panel 10 and the sensor layer 21 to each other with the bonding region 22A. It is therefore possible to suppress deterioration in sensor characteristics caused by deflection of the display panel 10.

Also, in the present modification, the bonding region 22A may include the plurality of dot-like adhesive parts 22-3 or the plurality of dot-like bonding parts 22-4. This makes it possible to easily remove the gap layer 22 as compared with the case where the bonding region 22A is formed of the sheet adhesive layer 22-1 or the sheet bonding layer 22-2. As a result, it is possible to easily perform reworking in manufacturing process.

[Modification 3]

FIG. 13 illustrates a modification of a planar configuration of the gap layer 22 of FIG. 7. FIG. 14 illustrates a modification of a planar configuration of the gap layer 22 of FIG. 8. In the present modification, the relaxation region 22B may be formed of clearance. Further, the bonding region 22A may include the plurality of dot-like adhesive parts 22-3 or the plurality of dot-like bonding parts 22-4. Each dot may have, for example, a columnar shape or a prism shape. FIG. 15 illustrates a state where curvature occurs at the center part of the display panel 10. FIG. 15S illustrates a state where the curvature occurs at the center part of the display panel 10 in the direction apart from the sensor layer 21 when the display panel 10 is not tightened by the housing 40. It may be assumed that, when the display panel 10 is not tightened by the housing 40, the curved part 10C exists at the center part of the display panel 10. At this time, the relaxation region 22B (clearance in this case) may be disposed in a part or the entire of the region facing the curved part 10C. In other words, the relaxation region 22B may be provided according to the position where the curved part 10C is generated. The bonding region 22A (the plurality of adhesive parts 22-3 or the plurality of bonding parts 22-4 in this case) may be disposed in a region facing a region of the display panel 10 that does not face the relaxation region 22B, for example, may be disposed in a region facing a part other than the curved part 10C of the display panel 10.

Next, effects of the display unit 1 according to the present modification are described. In the present modification, the gap layer 22 including the bonding region 22A and the relaxation region 22B is provided between the display panel 10 and the sensor layer 21, as with the foregoing embodiment. This makes it possible to relax stress applied from the curved part 10B to the sensor layer 21 by the relaxation region 22B while fixing the display panel 10 and the sensor layer 21 to each other by the bonding region 22A. It is therefore possible to suppress deterioration in sensor characteristics caused by deflection of the display panel 10.

Also, in the present modification, as with the modification 2, the bonding region 22A includes the plurality of dot-like adhesive parts 22-3 or the plurality of dot-like bonding parts 22-4. This makes it possible to easily remove the gap layer 22 as compared with the case where the bonding region 22A is formed of the sheet adhesive layer 22-1 or the sheet bonding layer 22-2. As a result, it is possible to easily perform reworking in manufacturing process.

[Modification 4]

FIG. 16 illustrates a state where the curved part 10B exists at the end of the display panel 10 in the display unit 1 provided with a modification of the gap layer 22 of FIG. 10 or FIG. 11. FIG. 16 illustrates a state where curvature occurs at the end of the display panel 10 in the direction apart from the sensor layer 21 when the display panel 10 is not tightened by the housing 40. FIG. 17 illustrates a state where curvature occurs at the center part of the display panel 10 in the display unit 1 provided with a modification of the gap layer 22 of FIG. 13 or FIG. 14. FIG. 17 illustrates a state where curvature occurs at the center part of the display panel 10 in the direction apart from the sensor layer 21 when the display panel 10 is not tightened by the housing 40.

In the present modification, the bonding region 22A may include the plurality of dot-like adhesive parts 22-3 or the plurality of dot-like bonding parts 22-4. Further, the relaxation region 22B may include a plurality of dot-like adhesive parts 22-5 or a plurality of dot-like bonding parts 22-6. When the bonding region 22A includes the plurality of dot-like adhesive parts 22-3, the relaxation region 22B may include the plurality of dot-like adhesive parts 22-5. When the bonding region 22A includes the plurality of dot-like bonding parts 22-4, the relaxation region 22B may include the plurality of dot-like bonding parts 22-6.

The plurality of adhesive parts 22-5 may be arranged in a matrix in plane. The plurality of bonding parts 22-6 may be arranged in a matrix in plane. A material similar to the material described as the material of the adhesive layer 22-1 may be used for the adhesive part 22-5 and the bonding part 22-6. The adhesive part 22-5 and the bonding part 22-6 each may have a thickness of, for example, about 0.5 μm to about 500 μm both inclusive.

The bonding strength of the relaxation region 22B may be lower than the bonding strength of the bonding region 22A. The bonding strength of the relaxation region 22B may be, for example, an extent that the adhesive part 22-5 or the bonding part 22-6 falls away from the curved part 10B of the display panel 10 when the display panel 10 is not tightened by the housing 40. The bonding strength of the bonding region 22A may be, for example, 1N/25 mm to 40N/25 mm. The bonding strength of the relaxation region 22B may be, for example, smaller than 1N/25 mm. Two specific but non-limiting examples of measures that allow the bonding strength of the relaxation region 22B to be lower than the bonding strength of the bonding region 22A are described below.

Specific Example 1

For example, population density of the plurality of adhesive parts 22-5 or the plurality of bonding parts 22-6 in the relaxation region 22B may be smaller than population density of the plurality of adhesive parts 22-3 or the plurality of bonding parts 22-4 in the bonding region 22A. To control the population density mentioned above, for example, the size of each dot may be adjusted or the number of dots per unit area may be adjusted. Note that, in the specific example 1, the bonding strength of each adhesive part 22-5 or each bonding part 22-6 may be equivalent to or lower than the bonding strength of each adhesive part 22-3 or each bonding part 22-4.

Specific Example 2

For example, the bonding strength of each adhesive part 22-5 or each bonding part 22-6 may be lower than the bonding strength of each adhesive part 22-3 or each bonding part 22-4. To control the bonding strength mentioned above, for example, the size of each dot may be adjusted, the adhesive part 22-5 and the adhesive part 22-3 may be formed of materials different in viscosity from each other, or the bonding part 22-6 and the bonding part 22-4 may be formed of materials different in adhesion force from each other. Note that, in the specific example 2, the population density of the plurality of adhesive parts 22-5 or the plurality of bonding parts 22-6 in the relaxation region 22B may be equivalent to or smaller than the population density of the plurality of adhesive parts 22-3 or the plurality of bonding parts 22-4 in the bonding region 22A.

Next, effects of the display unit 1 according to the present modification are described. In the present modification, the gap layer 22 including the bonding region 22A with relatively high bonding strength and the relaxation region 22B with relatively low bonding strength is provided between the display panel 10 and the sensor layer 21. This makes it possible to relax stress applied from the curved part 10B or 10C to the sensor layer 21 by the relaxation region 22B while fixing the display panel 10 and the sensor layer 21 to each other by the bonding region 22A. It is therefore possible to suppress deterioration in sensor characteristics caused by deflection of the display panel 10.

Also, in the present modification, the relaxation region 22B includes the plurality of dot-like adhesive parts 22-5 or the plurality of dot-like bonding parts 22-6. This makes it possible to uniform the height of the gap between the display panel 10 and the sensor layer 21 in plane even when the display surface 10A is pressed down by, for example, the pen 50, as compared with the case where the relaxation region 22B is formed of clearance.

Incidentally, in the present modification, for example, as illustrated in FIG. 18 and FIG. 19, the relaxation region 22B may include a plurality of dot-like non-adhesive parts 22-7. Also in this case, since the bonding strength of the relaxation region 22B is made lower than the bonding strength of the bonding region 22A, it is possible to suppress deterioration in sensor characteristics caused by deflection of the display panel 10.

[Modification 5]

FIG. 20 illustrates a state where the curved part 10B exists at the end of the display panel 10 in the display unit 1 provided with a modification of the gap layer 22 of FIG. 5. FIG. 20 illustrates a state where curvature occurs at the end of the display panel 10 in the direction apart from the sensor layer 21 when the display panel 10 is not tightened by the housing 40. FIG. 21 illustrates a state where curvature occurs at the center part of the display panel 10 in the display unit 1 provided with a modification of the gap layer 22 of FIG. 9. FIG. 21 illustrates a state where curvature occurs at the center part of the display panel 10 in the direction apart from the sensor layer 21 when the display panel 10 is not tightened by the housing 40.

In the present modification, both of the bonding region 22A and the relaxation region 22B may be formed of the sheet adhesive layer 22-1 or the sheet bonding layer 22-2. The bonding strength of the relaxation region 22B may be lower than the bonding strength of the bonding region 22A. The bonding strength of the relaxation region 22B may be, for example, an extent that the adhesive layer 22-1 or the bonding layer 22-2 falls away from the curved part 10B or 10C of the display panel 10 when the display panel 10 is not tightened by the housing 40. The bonding strength of the bonding region 22A may be, for example, 1N/25 mm to 40N/25 mm. The bonding strength of the relaxation region 22B may be, for example, smaller than 1N/25 mm.

To control the bonding strength mentioned above, for example, the adhesive layer 22-1 of the relaxation region 22B may be formed of a material different in viscosity from a material of the adhesive layer 22-1 of the bonding region 22A. Further, to control the bonding strength mentioned above, for example, the bonding layer 22-2 of the relaxation region 22B may be formed of a material different in adhesive force from a material of the bonding layer 22-2 of the bonding region 22A.

Next, effects of the display unit 1 according to the present modification are described. In the present modification, the gap layer 22 including the bonding region 22A with relatively high bonding strength and the relaxation region 22B with relatively low bonding strength is provided between the display panel 10 and the sensor layer 21. This makes it possible to relax stress applied from the curved part 10B or 10C to the sensor layer 21 by the relaxation region 22B while fixing the display panel 10 and the sensor layer 21 to each other by the bonding region 22A. It is therefore possible to suppress deterioration in sensor characteristics caused by deflection of the display panel 10.

Incidentally, in the present modification, for example, as illustrated in FIG. 22 and FIG. 23, the relaxation region 22B may be formed of a sheet non-adhesive layer 22-8. Also in this case, since the bonding strength of the relaxation region 22B is made lower than the bonding strength of the bonding region 22A, it is possible to suppress deterioration in sensor characteristics caused by deflection of the display panel 10.

[Modification 5]

FIGS. 24A, 24B, and 24C each illustrate a modification of a planar layout of the adhesive parts 22-3 and the bonding parts 22-4 in the bonding region 22A. FIGS. 25A, 25B, and 25C each illustrate a modification of a planar layout of the adhesive pans 22-5, the bonding parts 22-6, and the non-adhesive parts 22-7 in the relaxation region 22B.

In the bonding region 22A, for example, as illustrated in FIG. 24A, the adhesive parts 22-3 and the bonding parts 22-4 each may be formed in a lattice shape. Further, in the relaxation region 22B, for example, as illustrated in FIG. 25A, the adhesive parts 22-5, the bonding parts 22-6, and the non-adhesive parts 22-7 each may be formed in a lattice shape.

In the bonding region 22A, for example, as illustrated in FIG. 24B, the adhesive part 22-3 and the bonding part 22-4 each may be formed in a rod shape. Further, in the relaxation region 22B, for example, as illustrated in FIG. 25B, the adhesive part 22-5, the bonding part 22-6, and the non-adhesive part 22-7 each may be formed in a rod shape. At this time, the plurality of adhesive parts 22-3 and the plurality of bonding parts 22-4 may form a straight stripe pattern. Likewise, the plurality of adhesive parts 22-5, the plurality of bonding parts 22-6, and the plurality of non-adhesive parts 22-7 may also form a straight stripe pattern.

In the bonding region 22A, for example, as illustrated in FIG. 24C, the adhesive part 22-3 and the bonding part 22-4 each may be formed in a wave shape. Further, in the relaxation region 22-7, for example as illustrated in FIG. 25C, the adhesive part 22-5, the bonding part 22-6, and the non-adhesive part 22-7 may be formed in a wave shape. At this time, the plurality of adhesive parts 22-3 and the plurality of bonding parts 22-4 may form a waved stripe pattern. Likewise, the plurality of adhesive parts 22-5, the plurality of bonding parts 22-6, and the plurality of non-adhesive parts 22-7 may also form a waved stripe pattern.

Next, effects of the display unit 1 according to the present modification are described. In the present modification, the bonding region 22A includes the plurality of dot-like, lattice-like, or stripe-like adhesive parts 22-3 or bonding parts 22-4, and the relaxation region 22B includes the plurality of dot-like, lattice-like, or stripe-like bonding parts 22-5 or bonding parts 22-6. This makes it possible to easily remove the display panel 10 from the gap layer 22 as compared with the case where the bonding region 22A is formed of the sheet adhesive layer 22-1 or the sheet bonding layer 22-2. As a result, it is possible to easily perform reworking in manufacturing process. Further, as compared with the case where the relaxation region 22B is formed of clearance, it is possible to uniform the height of the gap between the display panel 10 and the sensor layer 21 in plane even when the display surface 10A is pressed down by, for example, the pen 50.

3. Second Embodiment

FIG. 26 illustrates an example of a sectional structure of an input unit 2 according to a second embodiment of the technology. The display unit 2 corresponds to the display unit 1 according to the above-described embodiment provided with a substrate 60 in place of the display panel 10.

The substrate 60 is a substrate including an operation surface 60A. The substrate 60 may be, for example, a flexible non-transparent resin plate or a flexible non-transparent metal plate. When the substrate 60 is not tightened by the housing 40, a curved part similar to the curved part 10B or 10C of the above-described embodiment may exist at an end or a center part of the substrate 60. The sensor device 20 detects a position on the operation surface 60A contacted or pressed by, for example, the pen 50, and outputs a detection result (a detection signal) to the driver 30.

The driver 30 may apply a voltage to the sensor device 20 to drive the sensor device 20, and receive the detection signal from the sensor device 20. The sensor device 20 may further generate an image signal based on the received detection signal, and output the image signal to outside. The housing 40 may protect the substrate 60, the sensor device 20, and the driver 30. The housing 40 may further fix the substrate 60 and the sensor device 20 to the housing 40. The housing 40 may include, for example, the bottom surface part 41, the side surface part 42, and the upper surface part 43. The bottom surface part 41 may face the back surface of the sensor device 20. The side surface part 42 may face a side surface of the substrate 60 and the side surface of the sensor device 20. The upper surface part 43 may face an edge of an upper surface of the substrate 60. For example, the ends of the substrate 60 and the sensor device 20 may be sandwiched by the bottom surface pan 41 and the upper surface part 43. The pen 50 may come into contact with the operation surface 60A or press the operation surface 60A. The sensor device 20 detects a position on the operation surface 60A contacted or pressed by the pen 50. Note that the pen 50 may be omitted. In this case, for example, a finger may be used in place of the pen 50.

[Effects]

Next, effects of the input unit 2 according to the present embodiment are described. In the present embodiment, the gap layer 22 including the bonding region 22A and the relaxation region 22B is provided between the substrate 60 and the sensor layer 21. In the case where the substrate 60 is not tightened by the housing 40, when a curved part (for example, curvature corresponding to the curved part 10B or 10C) exists at the end or the center part of the substrate 60, the relaxation region 22B is disposed in a part or the entire of the region facing the curved part. In contrast, the bonding region 22A is disposed in a region facing a region of the substrate 60 that does not face the relaxation region 22B. This makes it possible to relax stress applied from the curved part of the substrate 60 to the sensor layer 21 by the relaxation region 22B while fixing the substrate 60 and the sensor layer 21 to each other by the bonding region 22A. It is therefore possible to suppress deterioration in sensor characteristics caused by deflection of the substrate 60.

4. Modification Common to Embodiments

FIG. 27 illustrates a modification of a sectional structure of the display unit 1 according to the above-described first embodiment and the modifications thereof. FIG. 28 illustrates a modification of a sectional structure of the input unit 2 according to the above-described second embodiment. Note that illustration of the driver 30 is omitted in FIG. 27 and FIG. 28.

In the present modification, the gap layer 22 may be provided between the sensor layer 21 and the bottom surface part 41 of the housing 40. When a curved part (for example, curvature corresponding to the curved part 10B or 10C) exists at the end or the center part of the bottom surface part 41, the relaxation region 22B may be provided in a part or the entire of the region facing the curved part. The bonding region 22A may be disposed in a region facing a region of the bottom surface part 41 that does not face the relaxation region 22B. This makes it possible to relax stress applied from the curved part of the bottom surface part 41 to the sensor layer 21 by the relaxation region 22B while fixing the bottom surface part 41 and the sensor layer 21 to each other by the bonding region 22A. It is therefore possible to suppress deterioration in sensor characteristics caused by deflection of the bottom surface part 41.

5. Specific Example of Sensor Layer 21

FIG. 29 illustrates an example of a sectional structure of the sensor layer 21 together with an example of an internal configuration of the driver 30. The sensor layer 21 detects a position on the display panel 10 or the substrate 60 contacted or pressed by, for example, the pen 50. The sensor layer 21 may be of an electrostatic capacitance type, and may have a configuration in which, for example, an electrode substrate 210 is sandwiched by an electrically-conductive layer 211 and an electrically-conductive layer 217 in a vertical direction. The electrode substrate 210, the electrically-conductive layer 211, and the electrically-conductive layer 217 each may have flexibility. The electrode substrate 210 may include, for example, an insulating layer 212, a lower electrode 213, an insulating layer 214, an upper electrode 215, and an insulating layer 216 in this order from the electrically-conductive layer 211 side. The sensor layer 21 may include, for example, a gap between the electrically-conductive layer 211 and the electrode substrate 210, and a plurality of spacers 218 that maintain the gap. The sensor layer 21 may also include, for example, a gap between the electrically-conductive layer 217 and the electrode substrate 210, and a plurality of spacers 219 that maintain the gap. The plurality of spacers 218 and the plurality of spacers 219 may be so provided as not to be overlapped with each other as viewed from a thickness direction of the sensor layer 21.

The electrically-conductive layer 211 and the electrically-conductive layer 217 each may have a function of a shield layer that prevents variation in an electrostatic capacitance formed between the sensor layer 21 and the outside from affecting the inside of the sensor layer 21. The electrically-conductive layer 211 and the electrically-conductive layer 217 may be at a fixed potential, for example, at a ground potential. The electrically-conductive layer 211 and the electrically-conductive layer 217 may be each formed of a metal plate of, for example, SUS or iron. The metal plate may have flexibility. The electrically-conductive layer 211 and the electrically-conductive layer 217 may be formed of, for example, a film on which a metal thin film such as aluminum, carbon, CNT, ITO, IZO, a nano-metal wire, a silver fine wire, etc. is formed.

The lower electrode 213 may be provided at a position facing the electrically-conductive layer 211. The lower electrode 213 may include a plurality of partial electrodes each extending in a predetermined direction (the X direction in the drawing). In other words, the lower electrode 213 and the electrically-conductive layer 211 may detect variation in electrostatic capacitance at a coordinate position in a direction (the Y direction in the drawing) orthogonal to the extending direction of the lower electrode 213. The upper electrode 215 may be provided at a position facing the electrically-conductive layer 217. The upper electrode 215 may include a plurality of partial electrodes each extending in a direction (the Y direction in the drawing) orthogonal to the lower electrode 213. In other words, the upper electrode 215 and the electrically-conductive layer 217 may detect variation in electrostatic capacitance at a coordinate position in a direction (the X direction in the drawing) orthogonal to the extending direction of the upper electrode 215. The lower electrode 213 and the upper electrode 215 may be formed of, for example, a film on which a metal thin film such as aluminum, carbon, CNT, ITO, IZO, a nano-metal wire, a silver fine wire, etc. is formed.

The insulating layer 212 may insulate the electrically-conductive layer 211 and the lower electrode 213 from each other. The insulating layer 214 may insulate the lower electrode 213 and the upper electrode 215 from each other. The insulating layer 216 may insulate the upper electrode 215 and the electrically-conductive layer 217 from each other. The insulating layer 212, the insulating layer 214, and the insulating layer 216 each may be formed of, for example, a hard coating agent that is cured by UV light or heat after screen printing. Alternatively, the insulating layer 216 may be formed through patterning of a spin-coated photosensitive resin by photolithography.

The driver 30 may generate drawing data based on an output of the sensor layer 21 and output the drawing data to outside. For example, as illustrated in FIG. 29, the driver 30 may include a detector circuit 31, a calculation section 32, a memory 33, and an output section 34.

For example, the detector circuit 31 may read variation in electrostatic capacitance of the sensor layer 21 from variation of an amount of a current flowing through the electrode substrate 210. The detector circuit 31 may include, for example, a switching device, a signal source, and a current-voltage conversion circuit. The switching may device switch over the plurality of lower electrodes 213 and the plurality of upper electrodes 215 included in the electrode substrate 210. The signal source may supply an AC signal to the electrode substrate 210. The switching device may be, for example, a multiplexer. A plurality of terminals provided at one end of the multiplexer may be respectively coupled to ends of the respective lower electrodes 213 and ends of the respective upper electrodes 215, and one terminal provided on the other end of the multiplexer may be coupled to the signal source and the current-voltage conversion circuit.

For example, the detector circuit 31 may select the plurality of lower electrodes 213 one after another and select the plurality of upper electrodes 215 one after another. Thus, the detector circuit 31 may apply the AC signal to the plurality of lower electrodes 213 one after another and apply the AC signal to the plurality of upper electrodes 215 one after another. At this time, for example, as illustrated in FIG. 30 and FIG. 31, when the display surface 10A or the operation surface 60 is contacted or pressed by the pen 50, the electrostatic capacitance of the electrode substrate 210 may vary, and the variation may cause variation in the amount of the current flowing through the electrode 210. For example, the detector circuit 31 may convert the variation of the current amount into variation of a voltage, and provide the variation of the voltage to the calculation section 32. Even when the display surface 10A or the operation surface 60A is contacted by the pen 50, the electrode substrate 210 may be slightly deformed, which may result in variation in the electrostatic capacitance of the electrode substrate 210. Note that FIG. 30 illustrates an example of the sectional structure of the sensor 210 and one of the display panel 10 and the substrate 60 at the time when the display surface 10A or the operation surface 60A is contacted by the pen 50, in a simplified manner. FIG. 31 illustrates an example of the sectional structure of the sensor layer 21 and one of the display panel 10 and the substrate 60 at the time when the display surface 10A or the operation surface 60A is pressed by the pen 50, in a simplified manner.

The calculation section 32 may evaluate the voltage variation provided from the detector circuit 31 to detect a position on the display surface 10A or the operation surface 60A contacted or pressed by the pen 50. Further, the calculation section 32 may evaluate the voltage variation provided from the detector circuit 31 to derive magnitude of pressing force of the pen 50 on the display surface 10A or the operation surface 60A. The calculation section 32 may overlap derived position data (postscript data generated based on the output of the sensor layer 21) with the drawing data stored in the memory 33 to generate the drawing data. The calculation section 32 may store, in the memory 33, the drawing data that is generated by overlapping the derived position data (the postscript data generated based on the output of the sensor layer 21) with the drawing data stored in the memory 33, and output the drawing data to the output section 34. The memory 33 may hold the drawing data provided from the calculation section 32. The output section 34 may output, to the outside, the drawing data provided from the calculation section 32.

In the sensor layer 21, the drawing data corresponding to the image drawn on the display surface 10A or the operation surface 60A may be generated. More specifically, contact and pressing of the pen 50 to the display surface 10A or the operation surface 60A at the time when the image is drawn on the display surface 10A or the operation surface 60A with use of the pen 50 may be detected by the sensor layer 21. The drawing data may be generated with use of a result of the detection. In other words, presence of the display panel 10 or the substrate 60 may not interfere the generation of the drawing data. This is because the sensor layer 21 detects the contact and the pressing of the pen 50 to the display surface 10A or the operation surface 60A with use of variation in the electrostatic capacitance generated between the electrode substrate 210 and the electrically-conductive layer 211 and between the electrode substrate 210 and the electrically conductive layer 217, in a state where the electrode substrate 210 is electrically shielded by the electrically-conductive layers 211 and 217.

The display panel 10 or the substrate 60 is bonded to the sensor layer 21 with the gap layer 22 in between. This makes it possible to relax stress applied from the curved part 10B to the sensor layer 21 by the relaxation region 22 while fixing the sensor layer 21 and one of the display panel 10 and the substrate 60 to each other by the bonding region 22A. As a result, for example, in the sensor layer 21, falling away of the spacers 218 from the insulating layer 212 or falling away of the spacers 219 from the insulating layer 216 is prevented. It is therefore possible to suppress deterioration in sensor characteristics caused by deflection of the display panel 10 or the substrate 60.

Hereinbefore, although the technology has been described with referring to some embodiments and the modifications thereof, the technology is not limited thereto, and various modifications may be made. Note that the effects described in the present specification are illustrative. Effects of the embodiments of the technology are not limited to those described in the present specification. The technology may achieve effect other than the effects described in the present specification.

Further, for example, an embodiment of the technology may be configured as follows.

(1) A sensor device including:
a sensor layer provided at a position facing a surface, of a substrate having an operation surface, opposite to the operation surface, and configured to detect a contacted position or a pressed position on the operation surface; and
a gap layer located in a gap between the substrate and the sensor layer, the gap layer including a bonding region and a relaxation region, the bonding region bonding the substrate to the sensor layer, and the relaxation region relaxing stress applied from the substrate to the sensor layer.

(2) The sensor device according to (1), wherein
the bonding region and the relaxation region are each formed of dot-like, lattice-like, or stripe-like adhesive parts or dot-like, lattice-like, or stripe-like bonding parts, and
the relaxation region has bonding strength lower than bonding strength of the bonding region.

(3) The sensor device according to (2), wherein population density of the adhesive parts or the bonding parts in the relaxation region is smaller than population density of the adhesive parts or the bonding parts in the bonding region.

(4) The sensor device according to (2), wherein bonding strength of each of the adhesive parts or each of the bonding parts in the relaxation region is lower than bonding strength of each of the adhesive parts or each of the bonding parts in the bonding region.

(5) The sensor device according to (1), wherein
the bonding region is formed of dot-like, lattice-like, or stripe-like adhesive parts or dot-like, lattice-like, or stripe-like bonding parts,
the relaxation region is formed of dot-like, lattice-like, or stripe-like non-adhesive parts, and
the relaxation region has bonding strength lower than bonding strength of the bonding region.

(6) The sensor device according to (1), wherein
the bonding region is formed of dot-like, lattice-like, or stripe-like adhesive parts or dot-like, lattice-like, or stripe-like bonding parts, and
the relaxation region is formed of clearance.

(7) The sensor device according to (1), wherein
the bonding region is formed of one of a sheet adhesive layer and a sheet bonding layer, and the relaxation region is formed of clearance.

(8) The sensor device according to (1), wherein
the bonding region and the relaxation region are each formed of one of a sheet adhesive layer and a sheet bonding layer, and the relaxation region has bonding strength lower than bonding strength of the bonding region.

(9) The sensor device according to (1), wherein
the bonding region is formed of one of a sheet adhesive layer and a sheet bonding layer,
the relaxation region is formed of a sheet non-adhesive part, and
the relaxation region has bonding strength lower than bonding strength of the bonding region.

(10) The sensor device according to any one of (1) to (9), wherein
the bonding region is provided at a position facing a center part of the sensor layer, and
the relaxation region is provided at a position facing an edge of the sensor layer.

(11) The sensor device according to any one of (1) to (9), wherein
the bonding region is provided at a position facing an edge of the sensor layer, and
the relaxation region is provided at a position facing a center part of the sensor layer.

(12) The sensor device according to any one of (1) to (II) wherein the sensor layer has flexibility.

(13) A display unit provided with a display panel and a sensor device, the display panel including a display surface, and the sensor device being provided on side of the display panel opposite to the display surface, the sensor device including:
a sensor layer provided at a position apart from and facing the display panel, and configured to detect a contacted position or a pressed position on the display surface; and
a gap layer located in a gap between the display panel and the sensor layer, the gap layer including a bonding region and a relaxation region, the bonding region bonding the display panel to the sensor layer, and the relaxation region relaxing stress applied from the display panel to the sensor layer.

(14) An input unit provided with a substrate and a sensor device, the substrate including an operation surface, and the sensor device being provided on side of the substrate opposite to the operation surface, the sensor device including:
a sensor layer provided at a position apart from and facing the substrate, and configured to detect a contacted position or a pressed position on the operation surface; and
a gap layer located in a gap between the substrate and the sensor layer, the gap layer including a bonding region and a relaxation region, the bonding region bonding the substrate to the sensor layer, and the relaxation region relaxing stress applied from the substrate to the sensor layer.

This application is based upon and claims the benefit of priority of the Japanese Patent Application No. 2013-182S09 filed in the Japan Patent Office on Sep. 3, 2013, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A sensor device, comprising:
a sensor layer at a first position, wherein
a first surface of the sensor layer faces a second surface of a display panel having an operation surface,
the second surface is opposite to the operation surface, and the sensor layer is configured to detect one of a contacted position or a pressed position on the operation surface;

a gap layer in a gap between the display panel and the sensor layer, wherein the gap layer includes a bonding region and a relaxation region, the bonding region is at a second position on a central part of the sensor layer, the relaxation region is at a third position that faces an edge of the sensor layer, the bonding region bonds the display panel to the sensor layer, the relaxation region relaxes a stress applied from the display panel to the sensor layer, each of the bonding region and the relaxation region includes one of dot-like, lattice-like, or stripe-like adhesive parts or one of dot-like, lattice-like, or stripe-like bonding parts, and a first bonding strength of each of the adhesive parts or each of the bonding parts in the relaxation region is lower than a second bonding strength of each of the adhesive parts or each of the bonding parts in the bonding region.

2. The sensor device according to claim 1, wherein a first population density of the adhesive parts in the relaxation region is smaller than a second population density of the adhesive parts in the bonding region, and a first population density of the bonding parts in the relaxation region is smaller than a second population density of the bonding parts in the bonding region.

3. The sensor device according to claim 1, wherein the relaxation region is a clearance region.

4. The sensor device according to claim 1, wherein the bonding region further includes one of a sheet adhesive layer or a sheet bonding layer, and the relaxation region is a clearance region.

5. The sensor device according to claim 1, wherein each of the bonding region and the relaxation region further includes one of a sheet adhesive layer or a sheet bonding layer.

6. The sensor device according to claim 1, wherein the bonding region further includes one of a sheet adhesive layer or a sheet bonding layer, and the relaxation region is a sheet non-adhesive part.

7. The sensor device according to claim 1, wherein the sensor layer is a flexible layer.

8. A display unit, comprising:

a display panel that includes a display surface; and a sensor device on a first side of the display panel, wherein the first side is opposite to the display surface, and wherein the sensor device comprises:

a sensor layer at a first position apart from the display panel, wherein a first surface of the sensor layer faces the display panel, and the sensor layer is configured to detect one of a contacted position or a pressed position on the display surface; and a gap layer in a gap between the display panel and the sensor layer, wherein the gap layer includes a bonding region and a relaxation region, the bonding region is at a second position on a central part of the sensor layer, the relaxation region is at a third position that faces an edge of the sensor layer, the bonding region bonds the display panel to the sensor layer, the relaxation region relaxes stress applied from the display panel to the sensor layer, each of the bonding region and the relaxation region includes one of dot-like, lattice-like, or stripe-like adhesive parts or one of dot-like, lattice-like, or stripe-like bonding parts, and a first bonding strength of each of the adhesive parts or each of the bonding parts in the relaxation region is lower than a second bonding strength of each of the adhesive parts or each of the bonding parts in the bonding region.

9. An input unit, comprising:

a display panel that includes an operation surface; and a sensor device on a first side of the display panel, wherein the first side is opposite to the operation surface, and the sensor device comprises:

a sensor layer at a first position apart from the display panel, wherein a first surface of the sensor layer faces the display panel, and the sensor layer is configured to detect one of a contacted position or a pressed position on the operation surface; and a gap layer in a gap between the display panel and the sensor layer, wherein the gap layer includes a bonding region and a relaxation region, the bonding region is at a second position on a central part of the sensor layer and the relaxation region is at a third position that faces an edge of the sensor layer, and the bonding region bonds the display panel to the sensor layer, the relaxation region relaxes stress applied from the display panel to the sensor layer, each of the bonding region and the relaxation region includes one of dot-like, lattice-like, or stripe-like adhesive parts or one of dot-like, lattice-like, or stripe-like bonding parts, and a first bonding strength of each of the adhesive parts or each of the bonding parts in the relaxation region is lower than a second bonding strength of each of the adhesive parts or each of the bonding parts in the bonding region.

10. The sensor device according to claim 1, wherein an edge of the operation surface of the display panel faces an upper surface part of a housing.

11. The display unit according to claim 8, further comprising a housing, wherein an upper surface part of the housing is opposite to an edge of the display surface of the display panel.

* * * * *